US008628689B2

(12) United States Patent
Visser et al.

(10) Patent No.: US 8,628,689 B2
(45) Date of Patent: Jan. 14, 2014

(54) ANTI-CORROSIVE COATING COMPOSITION

(75) Inventors: Peter Visser, Voorhout (NL); Scott Alan Hayes, Zion, IL (US)

(73) Assignee: Akzo Nobel Coatings International B.V., Arnhem (NL)

( * ) Notice: Subject to any disclaimer, the term of this patent is extended or adjusted under 35 U.S.C. 154(b) by 193 days.

(21) Appl. No.: 13/259,773

(22) PCT Filed: Apr. 2, 2010

(86) PCT No.: PCT/EP2010/054463
§ 371 (c)(1),
(2), (4) Date: Sep. 23, 2011

(87) PCT Pub. No.: WO2010/112605
PCT Pub. Date: Oct. 7, 2010

(65) Prior Publication Data
US 2012/0025142 A1 Feb. 2, 2012

Related U.S. Application Data

(60) Provisional application No. 61/166,565, filed on Apr. 3, 2009, provisional application No. 61/255,262, filed on Oct. 27, 2009.

(30) Foreign Application Priority Data

Apr. 14, 2009 (EP) ..................................... 09157874

(51) Int. Cl.
C23F 11/173 (2006.01)
B05D 3/00 (2006.01)
B05D 7/14 (2006.01)
C23F 11/18 (2006.01)
B05D 7/24 (2006.01)

(52) U.S. Cl.
USPC .............. 252/389.62; 252/389.61; 252/389.2; 252/400.2; 252/400.61; 252/400.62; 427/388.4; 427/388.2

(58) Field of Classification Search
USPC ................. 252/389.61, 389.62, 389.2, 400.2, 252/400.61, 400.62; 427/388.4, 388.2
See application file for complete search history.

(56) References Cited

U.S. PATENT DOCUMENTS

| 4,153,574 | A | 5/1979 | Beiter et al. |
| 5,089,304 | A | 2/1992 | Kuder |
| 6,069,197 | A | 5/2000 | Daech et al. |
| 2006/0225612 | A1* | 10/2006 | Lejeune et al. .......... 106/287.13 |
| 2007/0106018 | A1 | 5/2007 | Kohler et al. |
| 2007/0128351 | A1 | 6/2007 | Nanna et al. |
| 2008/0090069 | A1* | 4/2008 | Walters et al. ................ 428/330 |
| 2009/0007822 | A1* | 1/2009 | Berke et al. .................... 106/778 |
| 2009/0155598 | A1 | 6/2009 | Bierwagen et al. |
| 2009/0226729 | A1* | 9/2009 | Niimoto et al. ............... 428/416 |
| 2012/0025142 | A1* | 2/2012 | Visser et al. ............. 252/389.61 |

FOREIGN PATENT DOCUMENTS

| EP | 0 316 066 | 5/1989 |
| EP | 1 770 106 | 4/2007 |
| NL | 7 800 986 | 8/1978 |
| WO | 99/29795 | 6/1999 |
| WO | 2008/066319 | 6/2008 |
| WO | 2008/138384 | 11/2008 |
| WO | 2010/006987 | 1/2010 |

OTHER PUBLICATIONS

International Search Report issued for PCT/EP2010/054463, dated Jun. 24, 2010, 14 pages.
European Search Report issued for EP 09157874.0, dated Oct. 26, 2009, 7 pages.
Buchheit, R. G., et al., "Corrosion-Resistant, Chromate-Free Talc Coatings for Aluminum", Corrosion Science, Mar. 1994, vol. 50, No. 3, pp. 205-214.
Database WPI Week 197739, Thomson Scientific, London, GB; Abstract of JP 52-098739, Aug. 18, 1977, 2 pages.

* cited by examiner

*Primary Examiner* — Joseph D Anthony
(74) *Attorney, Agent, or Firm* — Kenyon & Kenyon LLP

(57) ABSTRACT

The invention relates to a low temperature-curable coating composition comprising a film-forming resin, a curing agent for the film-forming resin, and a lithium salt.

19 Claims, No Drawings

ANTI-CORROSIVE COATING COMPOSITION

REFERENCE TO RELATED APPLICATION(S)

This application is the U.S. National Phase of PCT/EP2010/054463 filed on Apr. 2, 2010, and claims the benefit of U.S. Provisional Application Nos. 61/166,565, filed on Apr. 3, 2009, and 61/255,262, filed on Oct. 27, 2009.

The present invention relates to a coating composition and its use as anti-corrosive primer.

Hexavalent chromium compounds have long been in use as corrosion inhibitors in paints and conversion coatings for aluminium surfaces. However, hexavalent chromium is toxic and is therefore due to be phased out for environmental, worker safety, and regulatory reasons. While many alternative inhibitors have been proposed, none appeared to be as good, efficient, irreversible, and universal in their application. Hexavalent chromium-free formulations especially struggle to meet corrosion resistance standards based on ASTM B117 salt spray testing, which is a widely accepted aerospace industry method. Over the years several promising options for corrosion protection have been investigated, but implementation has been problematic due to compatibility issues with current technologies.

Bucheit et al., *Corrosion Science,* 50 (1994) 205-214, discloses the pre-treatment, prior to coating, of aluminium substrates with an aqueous solution comprising lithium carbonate and lithium hydroxide.

Coating compositions that contain lithium compounds are disclosed in U.S. Pat. No. 6,069,197 and EP 0 316 066. Coating compositions differ from pre-treatment solutions in that they contain a film-forming resin. U.S. Pat. No. 6,069,197 discloses coating compositions comprising aluminium lithium alloy particles and a water-soluble polymer containing carboxylic and/or phosphino-carboxylic acid-functional groups. EP 0 316 066 describes a corrosion-inhibiting composition comprising silica particles exchanged with corrosion-inhibiting ions such as lithium.

NL 7800986 A describes a non-aqueous dispersion as anti-fouling ingredient for solvent-borne coatings for boat hulls. The dispersion comprises a salt of lithium, sodium, berryllium, magnesium or calcium, and a triorganotin fluoride. U.S. Pat. No. 5,089,304 describes a composition providing anti-corrosive properties to copper substrates. The composition comprises a polybenzimidazole, an organic solvent, and optionally an inorganic salt such as lithium chloride to enhance the solubility of the polybenzimidazole.

US 2007/106018 A relates to moisture curing coating compositions based on isocyanate-functional polymers. The compositions provide anticorrosive properties to steel substrates. The composition optionally comprises a catalyst. Suitable catalysts include tin compounds, amines, amidines, guanidines, zinc compounds, cobalt compounds, bismuth compounds, and lithium salts. WO 2008/138384 A describes a removable coating composition for the temporary coating of turbine parts. The composition comprises a polysiloxane, organic solvent, and a filler. The filler can be selected from carbon powder, metal powder, strontium carbonate, calcium carbonate, sodium carbonate, lithium carbonate, magnesium carbonate, and mixtures thereof.

The object of the present invention is to provide a low-temperature curable coating composition with good anticorrosive properties which is easy to make with commercially available and relatively cheap materials, and which has a robust reproducible performance. Furthermore, it is an object of the present invention to provide an anticorrosive coating composition which has a reduced sensitivity to blistering.

These objects are achieved by the coating composition according to the present invention, which comprises a film-forming resin, a curing agent for the film-forming resin, and a lithium salt.

The coating composition according to the present invention is able to provide improved passivation of scribes during corrosion testing, which is recognized by a bright scribe, whereas other hexavalent chromium-free coating systems show dark deteriorated scribes after exposure to an ASTM B117 test. The coating composition according to the present invention also has good filiform corrosion resistance, pot-life, and stability. It further has reduced sensitivity to osmotic and/or corrosion-induced blistering.

This is surprising because one would expect that the addition of a water-soluble lithium salt to a coating composition would increase the water sensitivity of said coating composition, resulting in more osmotic blistering and, hence, unsatisfactory anti-corrosion coating systems.

Surprisingly, however, it has now been found that the addition of a water-soluble lithium salt to an anti-corrosive coating composition may even reduce blistering and improve corrosion resistance.

The coating composition according to the present invention suitably is a liquid coating composition. The composition may comprise a volatile liquid diluent, such as a volatile organic solvent or water. The composition may be water-borne, solvent-borne, or solvent-free. The term "solvent-free" is defined as containing a total volatile liquid diluent content, including water and organic solvent, of less than 5 wt %. The term "water-borne" is defined as containing at least 5 wt % of volatile liquid diluent, at least 50 wt % of the total weight of the volatile liquid diluent being water. The term "solvent borne" is defined as having a total volatile liquid diluent content, including water and organic solvent, of at least 5 wt %, more than 50 wt % of the total weight of volatile liquid diluent being organic solvent.

The coating composition according to the present invention is low temperature curable, which means that it is curable, i.e. can form a network, at a temperature below 120° C., preferably below 100° C., more preferably below 80° C., even more preferably below 50° C., and most preferably at ambient conditions.

The film-forming resin can be selected from, e.g., epoxy resins, hydroxy-functional resins (like polyesters and (meth)acrylates), resins with 1 or more blocked hydroxyl groups (like acetals), oxazolidine resins, carboxylic-acid-functional resins), polyacrylates, polyurethanes, polyethers, polyaspartic esters, (blocked) isocyanates, mercapto-functional resins, amine-functional resins, amide-functional resins, imide-functional resins (e.g. maleimide), alkyd resins, resins containing at least one olefinically unsaturated bond, silane-containing resins, polysiloxane resins, acetoacetate resins, functional (=curable) fluorinated resins, and mixtures and hybrids thereof. Epoxy resins and polyurethanes are the preferred resins for use in the composition according to the present invention. Hydroxy-functional resins preferably have a hydroxy functionality between 2.1 and 3.5 and an equivalence weight of at least 200 g/mol, based on solids.

Within the specification, the term "film-forming resin" includes monomers or oligomers which during curing of the coating form a polymeric system. Examples of such monomers or oligomers are siloxanes and silicates (e.g. tetraalkoxysilane or silanes functionalized with epoxy, amine, mercaptan, or olefinic functionalities), alone or in combination with organic monomers or oligomers. The polymeric system can be formed from the monomers or oligomers by various technologies, including sol-gel technology.

The resin is preferably present in the coating composition according to the present invention in an amount of 30-90 vol %, more preferably 40-80 vol %, and most preferably 45-55 vol %, based on the sum of the volumes of the non-volatile components of the coating composition. The volumes of the non-volatile components can be measured directly or they can calculated on the basis of their densities.

The coating composition further contains a curing agent for the film-forming resin, the type depending on the nature of the film-forming resin.

Acetoacetate resin-based coating compositions preferably contain a ketimine-based curing agent.

Epoxy resin-containing compositions preferably contain an aliphatic or aromatic amine curing agent, a polyamide curing agent, or a thiol-based curing agent. Suitable epoxy resins are Bisphenol A, Bisphenol F, Bisphenol A/F, Novolac and aliphatic epoxy resins. Suitable amine curing agents are aliphatic amines and their adducts (e.g. Ancamine® 2021), phenalkamines, cycloaliphatic amines (e.g. Ancamine® 2196), amido amines (e.g. Ancamide® 2426), polyamides and their adducts, and mixtures of thereof. The epoxy/NH ratio in epoxy-amine type coating compositions is preferably in the range 0.6 to 2.0, more preferably 0.8 to 1.7. For solvent-borne epoxy-amine coating compositions, the epoxy/NH ratio is preferably 0.6 to 1.4, more preferably 0.8 to 1.2, and most preferably in the range 0.85 to 1.1. For water-borne coating compositions, the epoxy/NH ratio is preferably 0.6 to 2.0, more preferably 0.9 to 1.7, and most preferably in the range 1.3 to 1.7.

Preferred curing agents for hydroxy-functional resins are isocyanates and isocyanurates. Suitable isocyanate curing agents are aliphatic, alicyclic, and aromatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 2,4-trimethyl hexamethylene diisocyanate, 2,4,4-trimethyl hexamethylene diisocyanate, dodecamethylene diisocyanate, $\alpha,\alpha'$-dipropyl ether diisocyanate, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, m- and p-phenylene diisocyanate, 1,3- and 1,4-bis(isocyanate methyl) benzene, 1,5-dimethyl-2,4-bis(isocyanate methyl)benzene, 1,3,5-triisocyanate benzene, 2,4-toluene diisocyanate, 2,6-toluene diisocyanate, 2,4,6-toluene triisocyanate, $\alpha,\alpha,\alpha',\alpha'$-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, naphthalene-1,5-diisocyanate, isophorone diisocyanate, transvinylidene diisocyanate, and mixtures of the aforementioned polyisocyanates.

Adducts of polyisocyanates are also suitable, e.g., biurets, isocyanurates, allophonates, uretdiones, and mixtures thereof. Examples of such adducts are the adduct of two molecules of hexamethylene diisocyanate or isophorone diisocyanate to a diol such as ethylene glycol, the reaction product of 3 molecules of hexamethylene diisocyanate and 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (Desmodur® N3390, ex Bayer), the uretdione of hexamethylene diisocyanate (Desmodur® N3400, ex Bayer), the allophonate of hexamethylene diisocyanate (Desmodur® LS 2101, ex Bayer), and the isocyanurate of isophorone diisocyanate (Vestanate® T1890, ex Hüls). Furthermore, (co)polymers of isocyanate-functional monomers such as $\alpha,\alpha'$-dimethyl-m-isopropenyl benzyl isocyanate are suitable for use. Finally, the above-mentioned isocyanates and adducts thereof may be present in the form of blocked or latent isocyanates.

The non-volatile content of the coating composition is preferably 35-95 wt %, more preferably 65-85 wt %, and most preferably 70-80 wt %. For water-borne coating compositions, the non-volatile content is most preferably in the range 40-45 wt %.

The Volatile Organic Content (VOC) of the coating composition (determined according to ASTM D3960) according to the present invention can be more than 700 g/L, but is preferably less than 350 g/L, more preferably less than 250 g/L.

The lithium salt that is present in the coating composition according to the present invention can be an inorganic or organic lithium salt. Both the anion and the cation of the lithium salt should be soluble in water. Lithium polysilicates and lithium-exchanged (silica) particles are therefore not considered to be lithium salts. The lithium salt preferably has a solubility constant in water at a temperature of 25° C. ($K_{sp}$; 25° C.) of at least $1 \times 10^{-11}$, more preferably in the range $1 \times 10^{-11}$ to $5 \times 10^{-2}$, and most preferably $1 \times 10^{-5}$ to $2.5 \times 10^{-2}$. The solubility constant is the product of the equilibrium concentrations of the ions in a saturated aqueous solution of the respective lithium salt. Each concentration is raised to the power of the respective coefficient of ion in the balanced equation. The solubility constants for different salts can be found in the *Handbook of Chemistry and Physics*.

Examples of suitable lithium salts are lithium carbonate, lithium phosphate, lithium sulphate, and lithium tetraborate. Lithium carbonate and lithium phosphate are preferred salts. Lithium carbonate is the most preferred salt.

The lithium salt is preferably present in the coating composition according to the present invention in an amount of 1-40 vol %, based on the sum of the volumes of the non-volatile components of the coating composition. For solvent-borne compositions, it is more preferably 1-15 vol %, and most preferably 3-9 vol %, based on dry film volume; for water-borne compositions it is more preferably 5-25 vol % and most preferably 10-20 vol %, based on dry film volume.

The volumes of the non-volatile components can be measured directly or they can be calculated on the basis of their densities. For powders and granular solids, the intrinsic volume or density is used, as opposed to the bulk volume or density.

In a preferred embodiment, the coating composition according to the invention comprises one or more additional corrosion inhibitors. Examples of inorganic inhibitors are potassium silicate; hydrogen phosphates such as $CaHPO_4$, $MgHPO_4$, and $SrHPO_4$; orthophosphates such as co-precipitated (multiphase pigment) zinc orthophosphate, zinc orthophosphate hydrate, zinc aluminium orthophosphate, and organically modified basic zinc orthophosphate; polyphosphates such as strontium aluminium polyphosphate hydrate, zinc aluminium polyphosphate hydrate, magnesium aluminium polyphosphate, zinc aluminium triphosphate, and magnesium aluminium triphosphate; phosphosilicates such as calcium strontium phosphosilicate and strontium zinc phosphosilicate; other phosphates such as zinc phosphate and strontium borophosphate; hybrid pigments using mixtures of inorganic and organic inhibitors such as Zinc phosphate $+ZnO+Zn(DMTD)_2$; metal oxides such as oxides of zinc, magnesium, aluminium, lithium, molybdate, strontium, cerium, and mixtures thereof; metals like metallic Zn, metallic Mg, and Mg alloys; and ion-exchange pigments such as calcium, magnesium, and lithium ion-exchange pigments. It should be noted that metallic Mg is only suitable for use in solvent-borne or solvent-free coatings compositions, because of its reactivity with water. Examples of organic inhibitors are azoles like imidazoles, thiazoles, tetrazoles, and triazoles like (substituted) benzotriazole, and 2-mercaptobenzothiazole; amines like N-phenyl-1.4-phenylenediamine and Schiff bases (condensation products of amine with aldehyde or ketone) like N,N'-o-phenylen-bis(3-methoxysalicyliden-imine); amino acids like tryptophan thiole group compounds like DMTD or 1-phenyl-2.5-dithiohydrazodicarbonamide; phthalazin derivatives like 2-[(7-anilino-5-[1,2,4]triazolo[3, 4-b][1,3,4]thiadiazin-3-yl)methyl]phthalazin-1(2H)-one; tannins and substituted uracils; phosphonic acid group-containing materials like styrenephosphonic acid; succinic acid; (benzothiazol-2-ylthio) succinic acid; fatty acid derivatives like linoleic acid and TEOA; tall oil fatty acid salts; and sulphonates.

The most preferred additional corrosion inhibitors are magnesium-containing materials, such as magnesium metal, magnesium oxide, oxyaminophosphate salts of magnesium (e.g. Pigmentan® 465M), magnesium carbonate, and magnesium hydroxide. Magnesium metal is suitable employed in the form of particles, for example in the form of powder, flakes, spheres or spheroids. It should be noted that magnesium metal and magnesium metal alloy particles require specific stabilizing agents when used in aqueous coating compositions. Such stabilizing agents are generally known and commercially available.

The additional corrosion inhibitors are preferably present in the coating composition in an amount of 0.1-50 vol %, more preferably 1-20 vol %, and most preferably 1-15 vol %, based on the sum of the volumes of the non-volatile components of the coating composition. The volumes of the non-volatile components can be measured directly or they can be calculated on the basis of their densities. For powders and granular solids, the intrinsic volume or density is used, as opposed to the bulk volume or density.

If a magnesium salt or oxide is present in the composition according to the invention, it is preferably present in a weight ratio Mg:Li of at least 0.1:1, more preferably at least 0.5:1, more preferably at least 1:1, and most preferably at least 3:1. This ratio is preferably less than 30:1, more preferably less than 25:1, even more preferably less than 15:1, still more preferably less than 10:1, and most preferably less than 8:1.

If a magnesium metal or alloy is present in the composition according to the invention, the weight ratio Mg:Li is preferably less than 500:1, more preferably less than 300:1, more preferably less than 250:1, even more preferably less than 100:1, even more preferably still less than 50:1, and most preferably less than 25:1.

Other compounds that may be present in the coating composition according to the present invention are pigments (e.g. titanium dioxide or iron oxide yellow), extenders (e.g. talcum, barium sulphate, mica, calcium carbonate, silica, or wollastonite), rheology modifiers (e.g. bentone SD 2 or organic rheology modifiers), flow and levelling agents (e.g. polysiloxanes and polyacrylate levelling additives), and solvents (e.g. ketones such as methyl isobutyl ketone, aromatics such as xylene, alcohols such as benzyl alcohol, esters such as butyl acetate, and aliphatic solvents).

The present invention further relates to the use of the coating composition according to the present invention as an anti-corrosive primer to coat non-ferrous substrates, such as magnesium, magnesium alloys, titanium, aluminium, aluminium alloy, and lithium-aluminium alloy substrates. A preferred non-ferrous substrate is aluminium alloy. Examples of suitable aluminium alloys are 2024-T3 (bare or clad), 7075-T6 (bare or clad), 6061, 6111, 5052, 5083, 5251, 5454, 7017, and 7020. The coating composition according to the present invention is also suitable to coat ferrous substrates, such as steel, zinc-galvanized steel, galvalume, and galfan.

The present invention further relates to the use of the coating composition according to the present invention to coat ferrous substrates. Examples of suitable ferrous substrates are cold and hot rolled steel, Stainless 304, B952 (zinc phosphate-modified), B1000 (iron phosphate-modified), and zinc-modified steel such as EZG 60G, EZG 60G with zinc phosphate modification, G90, and Galvanneal HIA Zn/Fe A45

The coating composition according to the present invention is also suitable to coat non-metallic construction materials like plastics, thermoplastic composites (e.g. CETEX® from Tencate), and Prepreg-based or Prepreg sandwich-based composites, such as the fibre-reinforced polymers or plastics sold under the name Hexply®. Also metal matrix composites and ceramic matrix composites can be coated with the coating composition according to the present invention.

The coating composition according to the present invention can be used as a primer, a self-priming topcoat, an intermediate coat, or a topcoat and may be applied to the substrate, with and without the use of a hexavalent chromium-free pretreatment with a sol-gel system such as AC-®131 (AC Tech), PreKote® (Pantheon Chemical), or a chemical conversion coating. It can also be applied to anodized surfaces, such as chromic acid anodized (CAA) surfaces, tartaric sulphuric acid anodized (TSA) surfaces, and boric sulphuric acid anodized (BSAA) surfaces. The coating composition can advantageously be used as an anticorrosive primer coating for non-ferrous metal substrates. In one embodiment, the coating composition is applied to a substrate to form a primer layer in a multilayer coating system comprising a primer layer and a topcoat. The topcoat may be clear coat or a pigmented topcoat. Alternatively, the topcoat comprises a colour and/or effect imparting base coat applied on the primer layer and a clear coat applied on top of the base coat layer.

The coating composition is especially suitable for use in the aerospace industry. The invention further relates to process of improving the corrosion resistance of a metal substrate comprising the steps of
  a) applying the coating composition according to the invention to the metal substrate, and
  b) curing the applied coating composition.

The metal of the metal substrate may be a non-ferrous metal, such as aluminium or an aluminium alloy. Alternatively, the metal may be a ferrous metal. The substrate may be the exterior or interior, including structural parts and the cabin, of an aircraft or a part thereof.

EXAMPLES

List of Chemicals Used:

| Material | Supplier |
| --- | --- |
| Solvents | |
| Methyl amyl ketone (CAS: 110-43-0) | Eastman Chemical Company |
| Xylene (CAS: 1330-20-7) | BP Chemical Ltd. |
| Dowanol ® PM glycol ether (CAS: 107-98-2) | Dow Chemical Company |
| Dowanol ® PPH glycol ether (CAS: 770-35-4) | Dow Chemical Company |
| Dowanol ® DPnB (CAS: 29911-28-2) | Dow Chemical Company |

-continued

| Material | Supplier |
|---|---|
| PM acetate (CAS: 62-38-4) | Eastman Chemical Company |
| n-butyl acetate (CAS: 123-86-4) | Eastman Chemical Company |
| Binders and Crosslinkers | |
| Epikote ® 828 (Bisphenol A epoxy resin) | Hexion Specialty Chemicals |
| Ancamine ® 2500 (Aliphatic amine) | Air Products and Chemicals |
| Desmophen ® 1100 (polyester polyol) | Bayer AG |
| Desmophen ® NH 1520 (amino-functional resin) | Bayer AG |
| Desmophen ® VPLS 2142 (aldimine) | Bayer AG |
| Tolonate ® HDT LV 2 (aliphatic polyisocyanate) | Perstorp |
| Tolonate ® HDT-LV (aliphatic polyisocyanate) | Perstorp |
| Bayhydur ® XP 2655 (hydrophilic isocyanate) | Bayer AG |
| Anquamine ® 419 (water based amine) | Air Products and Chemicals |
| Ancarez ® AR555 (water-based epoxy resin) | Air Products and Chemicals |
| Macrynal ® VSM 6299w/42WA (water-based acrylic polyol) | Cytec industries |
| NeoCry ® XK-103 (acrylic emulsion) | DSM NeoResins |
| Pigments, Extenders and Corrosion Inhibitors | |
| Lithium Carbonate 99.99% (CAS 554-13-2) | Sigma Aldrich |
| Lithium Phosphate (CAS 10377-52-3) | Sigma Aldrich |
| Lithium Tetraborate puriss p.a. (CAS: 12007-60-2) | Sigma Aldrich |
| Lithium Sulphate >98.5% (CAS: 10377-48-7) | Sigma Aldrich |
| Lithium Benzoate 99% (CAS 553-54-8) | Sigma Aldrich |
| Sodium Carbonate ACS reagent (CAS 497-19-8) | Sigma Aldrich |
| Potassium Carbonate ACS reagent (CAS 584-08-7) | Sigma Aldrich |
| Magnesium oxide >99% Mesh 325 (CAS 1309-48-4) | Sigma Aldrich |
| Pigmentan ® 465M (corrosion inhibitor) | Pigmentan |
| Heucophos ® SRPP (corrosion inhibitor) | Heubach GmbH |
| Heucophos ® ZPA (corrosion inhibitor) | Heubach GmbH |
| Wollastocoat ® 10ES (treated wollastonite) | Nyco Minerals Inc |
| Blanc fixe N (barium sulphate) | Sachtleben Chemie GmbH |
| Kronos ® 2310 (Titanium Dioxide) | Kronos Titan GmbH |
| Finntalc ® M 15 E (talcum) | Mono Minerals OY |
| Additives | |
| MPA ® 2000X (rheology modifier) | Elementis Specialties |
| BYK ®-346 (surface active additive) | Byk Chemie GmbH |
| BYK ®-358 N (surface active additive) | Byk Chemie GmbH |
| Surfynol ® 420 (surface active additive) | Air Products and Chemicals |
| Foamstar ® A-10 (defoamer) | Cognis |
| Disperbyk ®-190 (pigment dispersion additive) | Byk Chemie GmbH |
| Solsperse ® 32500 (pigment dispersion additive) | Lubrizol |
| Silquest ® A-1120 Silane (adhesion promoter) | Momentive Performance Materials |
| COAT-O-SIL ® 1770 (adhesion promoter) | Momentive Performance Materials |
| Dynasilan ® GLYMO (adhesion promoter) | Evonik Degussa GmbH |

-continued

| Material | Supplier |
|---|---|
| Other materials | |
| Sol gel AC-131 CB or BB | AC Tech |
| PreKote ® | Pantheon |
| SurTec ® 650 RTU | SurTec Deutschland GmbH |
| Scotch-Brite ® very fine red | 3M |
| Eclipse ® polyurethane topcoat (ECL-G-101, PC 233, TR-109) | AkzoNobel, Aerospace Coatings B.V. |
| Chromic acid anodized aluminium panels | Surface treatment Nederland BV |
| TSA treated aluminium panels | MECAPROTEC Industries France |

General Methods

Preparation of Paint Samples:

Dispersion Phase:

Two methods, milling by mini motor mill or by means of shaking, were used to make the pigment dispersions. Either of these can be used to produce the formulations mentioned in the examples.

Milling Using a Mini Motor Mill:

The prepared dispersion is milled using an Eiger® mini motor mill (50 cc milling chamber) filled with 150 gram Zirconox® grinding media with a size of 1.7-2.4 mm. The dispersions are passed through the milling chamber until a fineness of grind of less than 25 µm is achieved.

Dispersing by Means of Shaking:

Shaking can be used as an alternative method to milling with the mini motor mill. Approximately 150 mL of dispersion is prepared in a glass jar of 370 mL. 400 grams Zirconox® grinding media (1.7-2.4 mm) are added to the mixture. The samples are placed in a Skandex® paint shaker until the fineness of grind is less than 25 µm. After shaking the mixtures are filtered to remove the grinding media before adding the letdown phase.

Letdown Phase:

After dispersing Component A is completed by addition of the remaining ingredients while stirring. Prior to application, all samples were stored for at least 24 hours to make sure that the samples are stable.

Mixing Samples for Application:

The B component is added under stirring to ensure sufficient mixing to obtain homogeneous samples. This is especially important for the water-based examples.

Preparation of Test Panels:

Unless otherwise specifically described, test panels are typically 7.5 cm×15 cm (3×6-inch) and 0.8 mm thick. The alloy and pretreatments are described in each example. Prior to the coatings application the test panels are subjected to a specific pretreatment method.

Prior to the pretreatment the panels are degreased using a typical solvent cleaning solution (40% by weight isobutyl alcohol and 60% by weight N-butylacetate) followed by one of the following pretreatments:

Method A: Scotch-Brite®/Solvent Cleaning

The panel is gently abraded using a 3M Scotch-Brite®, very fine red pad. This is followed by cleaning the residues using the cleaning solvent. Panels are ready for application directly after the pre-treatment.

Method B: Sol Gel Application:

The panels are abraded using a 3M Scotch-Brite®, very fine red pad together with an alkaline cleaning solution (e.g. Turco® Jet Clean 91, ex Henkel Technologies) to obtain a water-break-free surface for at least 30 seconds. The panel is rinsed and the sol gel (AC-131 CB or BB ex AC Tech) is applied using a hand spray bottle or atomized using a HVLP spray gun with 5 bar pressure. A mist coat of the material is applied covering the substrates. The panels are allowed to dry at ambient conditions and can be coated 1-2 hours after the sol gel application.

Method C: PreKote® Application:

Spray PreKote® on the panel, abrade the panel using a 3M Scotch-Brite®, very fine red pad, let the matter rest for 2 minutes, and repeat the PreKote® abrasion step, finish with a water rinse, ensure a water-break-free surface for 30 seconds (other wise repeat step 2), allow the panels to dry at ambient conditions, apply coating after 1-2 hours drying time.

Method D: SurTec® 650 RTU:

The panels are abraded using a 3M Scotch-Brite®, very fine red pad together with an alkaline cleaning solution (e.g. Turco® Jet Clean 91, ex Henkel Technologies) to obtain a water-break-free surface for at least 30 seconds. The panel is rinsed and the SurTec® 650 RTU (Ready to Use) is applied using a HVLP spray gun with 5 bar pressure to atomize the material. The panels are stored at ambient conditions 23±2° C./50±5% RH for 1-2 hours before the application. The SurTec® material can be applied by a dipping process as well.

Method E: Pretreatment of Steel:

After the cleaning step the panels are burnished using a sanding machine. Initially the panel is sanded with P80 sanding paper followed by P220. The panels are cleaned using the cleaning solvent prior to paint application. Paint samples have to be applied as soon as possible within 1 hour after burnishing.

Application of Coatings for Testing:

Panels are typically coated by means of spraying using a HVLP gravity feed spray gun. The coatings are allowed to induct for 30 minutes after mixing of the separate components. In all examples typically a polyurethane topcoat is applied, the commercially available Eclipse® top coat (ECL-G-101, ex AkzoNobel Aerospace Coatings) is used with curing solution PC 233 and TR-109 reducer.

Tests Performed:

Fineness of grind: The test is performed according to ISO 1524. In brief, paint is applied to a Hegman gauge using a scraper. The fineness of grind is defined as the place where discrete solid particles are clearly visible in the groove of the gauge. This value (fineness of grind) is displayed as Hegman or as micrometers ($\mu m$)

Dry film thickness: The test is performed according to ISO 2808. In brief, this is a non-destructive precision measurement to measure the thickness of a dried paint system using an Eddy current instrument. These instruments work on the principle that a high frequency electromagnetic field, generated in the probe system of the instrument, will produce eddy currents in a conductor upon which the probe is placed, and that the amplitude and the phase of these currents are a function of the thickness of a non-conductive coating present between the conductor and the probe. (Examples of instruments are the Fischer Isoscope® MP1C for non ferrous and the Fischer Dualscope® for Ferrous and Non-Ferrous substrates).

Cross-hatch adhesion test: The test is performed according to ISO 2409 after 7 days curing and 7 days immersion in water. Briefly, the test method is executed by scribing through the coating to a metal panel with a sharp knife, a first set of 6 parallel lines (2 mm apart). A second, similar set of lines is then scribed on the panel at a 90 degrees angle to the first set. Following this, a strip of tape coated with a pressure-sensitive adhesive is pressed against the painted surface on the scribed portion of the test panel and then quickly removed. The coating is evaluated qualitatively according to the amount of paint removed by the adhesive on the tape.

Evaluation Scale Crosshatch Test:

| Scale | Gt 0 | Gt 1 | Gt 2 | Gt 3 | Gt 4 | Gt 5 |
|---|---|---|---|---|---|---|
| Affected area in Crosscut area | none | <4% | 4-30% | 30-50% | 50-60% | >60% |

Corrosion Resistance Test (ASTM B117) and Rating:

Corrosion-resistance of coated parts is measured by means of the standard salt spray (fog) test for paints and varnishes as described in ASTM B117. In this test, the parts are placed in a chamber kept at constant temperature (e.g. 35° C.) where they are exposed to a fine spray (fog) of a 5 percent salt solution for specified periods of time.

Before subjecting the panels to the corrosion test a scribe (preferably Saint Andrew's cross, 200-250 $\mu m$ deep and 1 mm wide, U-shape scribe) is made by mechanically milling. After scribing the backsides of the panels are taped (e.g. Tesaflex® 4163) to prevent corrosion on the backsides and edges of the panels.

Panels are evaluated on appearance in the scribe (dark, black, shiny), corrosion products in the scribe (calculating % of area affected of the total scribe area), Corrosion around the scribe is evaluated by measuring the corrosion creep or size of the corrosion blister from the scribe.

Rating Osmotic Blistering of Painted Specimen:

This method is performed as described in ASTM-D714. It is used to evaluate the size of the osmotic blisters using a scale for blister size of 10 to 0 (10 is perfect, no blisters, 9 means very small, and 3 means large blisters) and, secondly, the density of the blisters (F=Few, M=Medium, D=Dense) This kind of evaluation is performed directly after the immersion in water or corrosion testing of painted substrates.

Example 1

Use of Lithium Carbonate in a Solvent-Borne Epoxy Coating

This example demonstrates the effect of using a lithium salt in a screening experiment, comparing it to several different chrome-free corrosion inhibitors recommended for aluminium alloys (polyphosphate, e.g. Heucophos® SRPP, and a zinc aluminium ortho phosphate hydrate, e.g. Heucophos® ZPA, oxyaminophosphate salt of magnesium, Pigmentan® 465M).

TABLE 1.1

| Formulations to obtain 250 ml of mixed product | | | | | |
|---|---|---|---|---|---|
| | 1-A | 1-B | 1-C | 1-D | 1-E |
| Component A Dispersion phase | | | | | |
| Methyl amyl ketone | 23.36 | 11.81 | 20.71 | 21.08 | 20.97 |
| Epikote ® 828 | 23.40 | 18.97 | 10.57 | 10.76 | 10.70 |
| Solsperse ® 32500 | 3.65 | 3.69 | 6.95 | 5.76 | 5.73 |
| Kronos ® 2310 | 27.34 | 27.64 | 40.36 | 41.08 | 40.85 |
| Lithium carbonate | | 59.85 | | | |
| Pigmentan ® 465M | | | 22.73 | | |
| Heucophos ® SRPP | | | | 31.95 | |
| Heucophos ® ZPA | | | | | 33.97 |
| Blanc fixe N | | | 47.63 | 48.48 | 48.21 |

TABLE 1.1-continued

| Formulations to obtain 250 ml of mixed product | | | | | |
|---|---|---|---|---|---|
| | 1-A | 1-B | 1-C | 1-D | 1-E |
| Wollastocoat ® 10 ES | 105.47 | 24.36 | 37.64 | 38.31 | 38.10 |
| MPA ®-2000X | 2.94 | 2.97 | 2.41 | 2.45 | 2.44 |
| High speed dissolver | | | | | |
| Methyl amyl ketone | 0.00 | 11.81 | 5.94 | 6.04 | 6.01 |
| Epikote ® 828 | 0.00 | 18.97 | 15.29 | 15.56 | 15.48 |
| Grinding on mini motor mill | | | | | |
| Let down phase | | | | | |
| Epikote ® 828 | 51.29 | 37.54 | 47.55 | 47.34 | 47.55 |
| Methyl amyl ketone | 17.39 | 17.47 | 14.69 | 14.62 | 14.67 |
| BYK ® 358N | 2.54 | 2.57 | 1.24 | 1.24 | 1.24 |
| Component B | | | | | |
| Xylene | 20.00 | 20.30 | 21.98 | 21.88 | 21.98 |
| Ancamine ® 2500 | 54.12 | 54.70 | 51.15 | 50.93 | 51.15 |
| Silquest ® A-1120 Silane | 6.76 | 6.25 | 7.03 | 7.00 | 7.03 |
| Total | 338.25 | 318.88 | 353.85 | 364.47 | 366.06 |
| General paint properties | | | | | |
| Density (Kg/l) | 1.35 | 1.28 | 1.42 | 1.46 | 1.46 |
| Epoxy/amine | 1.00 | 1.00 | 1.00 | 1.00 | 1.00 |
| Non-volatiles by weight (%) | 74.67 | 72.95 | 75.27 | 76.11 | 76.20 |
| Non-volatiles by volume (%) | 60.84 | 61.27 | 60.57 | 60.75 | 60.73 |
| PVC | 28.40 | 28.50 | 29.50 | 29.60 | 29.80 |
| VOC less water (g/l) | 340.00 | 345.00 | 350.00 | 348.00 | 348.00 |

Sample Preparation:

Component A was prepared according to the following procedure: all components were added in the order displayed in the table (top down) under a high speed dissolver to a 500 ml can. All ingredients were added under stirring. After the addition of the MPA® 2000x, the mixture was dispersed for a further 10 minutes having a good dispersing vortex (2,000-3,000 rpm) depending on the viscosity to achieve a minimum temperature of 55° C. to activate the MPA-2000x rheology agent. The temperature did not exceed 70° C. The remaining Epikote® 828 and methyl amyl ketone were added and the formulations were milled with an Eiger® mini motor mill to achieve a fineness of grind of less than 25 μm. Subsequently, the letdown phase (Epikote® 828, methyl amyl ketone, and BYK® 358N) was added in this order while stirring the mixture to complete component A. The curing solution, component B, was prepared separately by mixing with a spatula.

For this example 2024 T3 clad and bare panels were prepared according to pretreatment method A.

Component B was added to Component A and was stirred to a homogeneous mixture. 30 minutes after mixing, the paints were applied in one wet coat to a dry film thickness of 20-30 μm. The coated panels were cured overnight at 23±2° C./50±5% RH. A polyurethane based topcoat Eclipse® (ECL-G-101) was applied in 2 coats with 30 minutes flash-off between coats, achieving a dry film thickness of 60-70 μm.

All samples were cured at 23±2° C./50±5% RH for 7 days before starting the testing.

TABLE 1.2

| | | Adhesion | | | |
|---|---|---|---|---|---|
| | | Adhesion 7 days | | Adhesion after 7 days water immersion | |
| Sample | Description | 2024 T3 Unclad | 2024 T3 Clad | 2024 T3 Unclad | 2024 T3 Clad |
| 1-A | Neg Ref | Gt 0 | Gt 0 | Gt 0 | Gt 0 |
| 1-B | Lithium Carbonate | Gt 0 | Gt 0 | Gt 0 | Gt 0 |
| 1-C | Pigmentan ® 465M | Gt 0 | Gt 0 | Gt 0 | Gt 0 |
| 1-D | Heucophos ® SRPP | Gt 0 | Gt 0 | Gt 0 | Gt 0 |
| 1-E | Heucophos ® ZPA | Gt 0 | Gt 0 | Gt 0 | Gt 0 |

TABLE 1.3

Observations after 500 hrs neutral salt spray exposure

| | | 500 hrs Neutral Saltspray (ASTM B117) | | | | | | | |
|---|---|---|---|---|---|---|---|---|---|
| | | 2024 T3 unclad | | | | 2024 T3 Clad | | | |
| sample | Inhibitor | Scribe Visual appearance | Corrosion Products % area scribe | Creep from scribe (mm) | Blisters ASTM D 714 | Scribe Visual appearance | Corrosion products % area scribe | creep from scribe (mm) | Blistering ASTM D 714 |
| 1-A | Neg Ref | Dark | 40% | 0 mm | 10 | dark | 25% | 0 mm | 10 |
| 1-B | Lithium Carbonate | Shiny | <2% | 0 mm | 10 | Shiny | <2% | 0 mm | 10 |
| 1-C | Pigmentan 465M | Dark | 40% | 0 mm | 10 | Dark | 25% | 0 mm | 10 |
| 1-D | Heucophos SRPP | Dark | 25% | 0 mm | 10 | Dark | 50% | 0 mm | 10 |
| 1-E | Heucophos ZPA | Dark | 30% | 0 mm | 10 | Dark | 30% | 0 mm | 10 |

TABLE 1.4

Observations after 2,000 hrs neutral salt spray exposure 2,000 hrs neutral Saltspray (ASTM B117)

| | | 2024 T3 unclad | | | | 2024 T3 Clad | | | |
|---|---|---|---|---|---|---|---|---|---|
| sample | Inhibitor | Scribe Visual appearance | Corrosion Products % area scribe | Creep from Scribe (mm) | Blisters ASTM D 714 | Scribe Visual Appearance | Corrosion products % area scribe | creep from scribe (mm) | Blistering ASTM D 714 |
| 1-A | Neg Ref | Black | 60% | 4 mm | 10 | Black | 35% | 2.5 mm | 10 |
| 1-B | Lithium Carbonate | Shiny | 45% | 1 mm | 10 | Shiny | 20% | 1 mm | 10 |
| 1-C | Pigmentan 465M | Dark | 80% | 1 mm | 10 | Dark | 40% | 1 mm | 10 |
| 1-D | Heucophos SRPP | Dark | 80% | 3 mm | 10 | Dark | 50% | 1 mm | 10 |
| 1-E | Heucophos ZPA | Dark | 70% | 1 mm | 10 | Dark | 40% | 1 mm | 10 |

All samples provided a good adhesion on both substrates. The panels were examined initially after 500 hrs neutral salt spray exposure. Already after this time of exposure all commercially available corrosion inhibitors showed darkened scribes with significant deposits of white corrosion products with a very dense structure. No corrosion-induced blisters or creep along the scribe or osmotic blisters on the face of the panel were observed. A striking difference was the fact that the sample containing lithium carbonate showed no darkening of the scribe but instead showed a shiny scribe with almost no corrosion products. This observation is special because none of the tested chrome-free corrosion inhibitors has shown this behaviour. This observation indicates that lithium carbonate is providing early and effective passivation of the scribe where the other inhibitors are lacking this property and already show significant amounts of corrosion products after 500 hrs of exposure. After extending the corrosion test to 2,000 hrs, the sample with lithium carbonate remained shiny.

The sample collects more deposits in the scribe. Compared to the affected area and density of the comparative inhibitors, the amount and thickness of these corrosion deposits are significantly lower.

The observations are similar for the clad and bare 2024 T3 aluminium alloys. On the clad and bare 2024 T3 panels some creep from the scribe can be observed. The sample with lithium carbonate displays a lower amount of creep and less pit corrosion in the scribe compared to the state of the art commercially available corrosion inhibitors.

These observations indicate that lithium carbonate exhibits a good anticorrosive nature when incorporated in coatings.

Example 2

Application of Various Lithium Salts in a Solvent-Based Epoxy Amine Coating Composition This example demonstrates the activity of lithium salts in general compared to alternative carbonate salts and a commonly used extender. Several lithium salts were selected to be incorporated into the paint formulations. All salts were added to the formulation in the same volume of the dry film based on the density of the lithium salt.

TABLE 2.1

Formulations to obtain 250 ml of mixed product.

| | Formulation | | | | | | | |
|---|---|---|---|---|---|---|---|---|
| | 2-A | 2-B | 2-C | 2-D | 2-E | 2-F | 2-G | 2-H |
| Component A | | | | | | | | |
| Methyl amyl ketone | 41.06 g | 41.06 g | 42.33 g | 41.06 g | 41.06 g | 41.06 g | 41.06 g | 41.06 g |
| Solsperse ® 32500 | 7.00 g | 7.00 g | 7.21 g | 7.00 g | 7.00 g | 7.00 g | 7.00 g | 7.00 g |
| Epikote ® 828 | 73.94 g | 73.95 g | 76.24 g | 73.95 g | 73.95 g | 73.95 g | 73.95 g | 73.95 g |
| Lithium Carbonate | 47.29 g | | | | | | | |
| Lithium Phosphate | | 56.91 g | | | | | | |
| Lithium Tetraborate | | | 53.13 g | | | | | |
| Lithium Sulphate | | | | 49.29 g | | | | |
| Lithium Benzoate | | | | | 51.53 g | | | |
| Sodium Carbonate | | | | | | 56.69 g | | |
| Potassium carbonate | | | | | | | 54.22 g | |
| Wollastocoat ® 10ES | | | | | | | | 64.98 g |
| Blanc fixe N | 30.21 g | 30.22 g | 31.15 g | 30.22 g | 30.22 g | 30.22 g | 30.22 g | 30.22 g |
| Wollastocoat ® 10 ES | 23.88 g | 23.88 g | 24.62 g | 23.88 g | 23.88 g | 23.88 g | 23.88 g | 23.88 g |
| Kronos ® 2310 | 25.60 g | 25.60 g | 26.39 g | 25.60 g | 25.60 g | 25.60 g | 25.60 g | 25.60 g |
| MPA ®-2000 X | 2.43 g | 2.43 g | 2.50 g | 2.43 g | 2.43 g | 2.43 g | 2.43 g | 2.43 g |
| BYK ®-358-N | 1.25 g | 1.25 g | 1.29 g | 1.25 g | 1.25 g | 1.25 g | 1.25 g | 1.25 g |
| B component | | | | | | | | |
| Xylene | 22.14 g | 22.14 g | 22.83 g | 22.14 g | 22.14 g | 22.14 g | 22.14 g | 22.14 g |
| Ancamine ® 2500 | 51.53 g | 51.53 g | 53.13 g | 51.53 g | 51.53 g | 51.53 g | 51.53 g | 51.53 g |
| Silquest ® A-1120 Silane | 7.08 g | 7.08 g | 7.30 g | 7.08 g | 7.08 g | 7.08 g | 7.08 g | 7.08 g |
| Total Weight | 333.41 g | 343.04 g | 348.12 g | 335.42 g | 337.66 g | 342.81 g | 340.35 g | 351.11 g |

Sample Preparation:

Component A was Prepared According to the Following Procedure:

All components were added under stirring to a 370 ml glass jar. After the addition of the final component, 400 grams of Zirconox® pearls (1.7-2.4 mm) were added to the mixture. The salts were dispersed to a particle size smaller than 25 μm by shaking for 10 to 30 minutes on a Skandex® paint shaker. After shaking, the mixtures were filtered. Component B was prepared separately.

For this example the 2024 T3 bare and clad panels were prepared according to pretreatment method A.

Component B was added to component A and the mixture was stirred to a homogeneous mixture. 30 minutes after mixing the paints were applied in one wet coat to a dry film thickness of 20-30 μm. After overnight cure at ambient condition a polyurethane based topcoat Eclipse® (ECL-G-101) was applied in 2 coats with 30 minutes flash-off between coats, achieving a dry film thickness of 60-70 μm. All samples were cured at 23±2° C./50±5%) RH for 7 days before testing.

TABLE 2.2

Adhesion

| Sample | description | Adhesion 7 Days 2024 T3 Bare | Adhesion 7 Days 2024 T3 Clad | Adhesion after 7 days water immersion 2024 T3 Bare | Adhesion after 7 days water immersion 2024 T3 Clad |
| --- | --- | --- | --- | --- | --- |
| 2-A | Lithium Carbonate | Gt 0 | Gt 2 | Gt 0 | Gt 0 |
| 2-B | Lithium Phosphate | Gt 0 | Gt 2 | Gt 0 | Gt 0 |
| 2-C | Lithium Tetraborate | Gt 0 | Gt 5 | Gt 5 | Gt 2 |
| 2-D | Lithium Sulphate | Gt 0 | Gt 2 | Gt 5 | Gt 2 |
| 2-E | Lithium Benzoate | Gt 2* | Gt 2* | Gt 5* | Gt 5* |
| 2-F | Sodium Carbonate | Gt 0 | Gt 0 | Gt 5 | Gt 5 |
| 2-G | Potassium carbonate | Gt 0 | Gt 0 | Gt 5* | Gt 5* |
| 2-H | Wollastocoat 10ES | Gt 0 | Gt 2 | Gt 1 | Gt 0 |

*loss of adhesion at interface primer/topcoat

TABLE 2.3

Observations after 500 hrs Neutral salt spray exposure

| | | 500 hrs Neutral Salt spray (ASTM B117) | | | | | | | |
| --- | --- | --- | --- | --- | --- | --- | --- | --- | --- |
| | | 2024 T3 unclad | | | | 2024 T3 Clad | | | |
| sample | Description | Scribe Visual appearance | Corrosion Products % area scribe | Creep from Scribe | Blisters ASTM D 714 | Scribe Visual appearance | Corrosion Products % area scribe | Creep from scribe | Blisters ASTM D 714 |
| 2-A | Lithium Carbonate | Shiny | 2% | 1 mm | 10 | Shiny | 2% | 0.5 mm | 10 |
| 2-B | Lithium Phosphate | Dull | 10% | 0 mm | 10 | Dull | none | 0 mm | 10 |
| 2-C | Lithium Tetraborate | Shiny | 0% | 0 mm | 7D | Shiny | none | 0 mm | 7 M |
| 2-D | Lithium Sulphate | Shiny | 5% | 2 mm | 3D | Shiny | 2% | 0 mm | 4 D |
| 2-E | Lithium Benzoate | Shiny | 0% | 0 mm | 3 M | Shiny | none | 0 mm | 3 M |
| 2-F | Sodium Carbonate | Black | 10% | 0 mm | 0 D | Black | 2% | 0 mm | 0 D |
| 2-G | Potassium carbonate | Black | 25% | 3 mm | 8 M | Black | 55% | 1 mm | 8 M |
| 2-H | Wollastocoat 10ES | Black | 50% | 4 mm | 10 | Black | 80% | 4 mm | 10 |

Compared to the extender and to the alternative carbonates, the compositions containing lithium salts show a distinct difference in scribe appearance. Shiny, bright scribes are observed with a reduced amount of corrosion products present, suggesting a passivation mechanism. Due to the risk of osmotic blistering, it is not common to include these types of soluble salts in coatings at these high levels. This is confirmed by the evaluation of blistering using the ASTM D-714 scale after exposure in the neutral salt spray. Lithium carbonate and lithium phosphate do not show any sign of osmotic blistering. This osmotic effect is also clearly observed when performing the adhesion tests. All salts except lithium phosphate and lithium carbonate display adhesive failure after immersion in water.

Lithium phosphate having the lowest solubility shows the lowest degree of brightness in the scribe. Compared to the sodium and potassium salts, the performance of the lithium salt is striking and much better. The results demonstrate that the lithium ion and not the salt specifically is mainly responsible for the passivation effect in the scribe. Low solubility means a lower amount of ions in solution, resulting in dull but still clean scribes, whereas high solubility means high levels of lithium ions in the scribe and shiny scribes. However, all lithium-containing samples display a lower amount of corrosion products in the scribe and a significantly different appearance compared to the uninhibited samples. These observations demonstrate that the addition of lithium salts to coating formulations improves the corrosion protection.

Example 3

Synergistic Effect of Lithium Carbonate with Other Chrome-Free Corrosion Inhibitors in a Solvent-Based Epoxy Amine Coating Currently many different chrome-free corrosion inhibitors are available on the market. However, many of these inhibitors are not able to provide sufficient protection to the scribe of aluminium alloys and other metals. Often darkening of the scribe and early salt formation (corrosion products) are observed. This example demonstrates a synergistic effect of lithium carbonate with currently available commercial inhibitors (polyphosphate, e.g. Heucophos® SRPP, and a zinc phosphate, e.g. Heucophos® ZPA, oxyaminophosphate salt of magnesium, Pigmentan® 465M).

TABLE 3.1

| Formulation to obtain 250 ml mixed paint | | | | | | | | |
|---|---|---|---|---|---|---|---|---|
| | 3-A | 3-B | 3-C | 3-D | 3-E | 3-F | 3-G | 3-H |
| Component A dispersion phase | | | | | | | | |
| Methyl amyl ketone | 21.10 | 21.08 | 20.97 | 20.97 | 20.71 | 20.71 | 20.71 | 20.71 |
| Epikote ® 828 | 10.76 | 10.76 | 10.70 | 10.70 | 10.56 | 10.56 | 10.57 | 10.57 |
| Solsperse ® 32500 | 5.76 | 5.76 | 5.73 | 5.73 | 6.95 | 6.95 | 6.95 | 6.95 |
| Kronos ® 2310 | 41.10 | 41.08 | 40.85 | 40.85 | 40.34 | 40.34 | 40.36 | 40.36 |
| Lithium carbonate | 23.27 | | 23.12 | | 22.83 | | 22.84 | |
| Blanc fixe N | | 48.48 | | 48.21 | | 47.62 | | 47.63 |
| Pigmentan ® 465M | | | | | | | 22.73 | 22.73 |
| Heucophos ® SRPP | 31.97 | 31.95 | | | | | | |
| Heucophos ® ZPA | | | 33.97 | 33.97 | | | | |
| Magnesium oxide | | | | | 38.74 | 38.74 | | |
| Wollastocoat ® 10 ES | 38.34 | 38.31 | 38.10 | 38.10 | 37.63 | 37.63 | 37.64 | 37.64 |
| MPA ®-2000X | 2.45 | 2.45 | 2.44 | 2.44 | 2.41 | 2.41 | 2.41 | 2.41 |
| High speed dissolver | | | | | | | | |
| Methyl amyl ketone | 6.05 | 6.04 | 6.01 | 6.01 | 5.96 | 5.96 | 15.29 | 5.94 |
| Epikote ® 828 | 15.57 | 15.56 | 15.47 | 15.48 | 15.28 | 15.28 | 5.94 | 15.29 |
| Grinding on mini motor mill let down phase | | | | | | | | |
| Epikote ® 828 | 47.31 | 47.34 | 47.55 | 47.55 | 47.55 | 47.55 | 47.55 | 47.55 |
| Methyl amyl ketone | 14.61 | 14.62 | 14.68 | 14.67 | 14.67 | 14.68 | 14.68 | 14.69 |
| BYK ® 358N | 1.24 | 1.24 | 1.24 | 1.24 | 1.24 | 1.24 | 1.24 | 1.24 |
| Component B | | | | | | | | |
| Xylene | 21.87 | 21.88 | 21.98 | 21.98 | 21.98 | 21.98 | 21.98 | 21.98 |
| Ancamide ® 2500 | 50.90 | 50.93 | 51.15 | 51.15 | 51.15 | 51.15 | 51.15 | 51.15 |
| Silquest ® A-1120 Silane | 6.99 | 7.00 | 7.03 | 7.03 | 7.03 | 7.03 | 7.03 | 7.03 |
| Total | 339.30 | 364.47 | 340.97 | 366.06 | 345.05 | 369.83 | 329.06 | 353.85 |
| Content Lithium salt | | | | | | | | |
| % Vol. Lithium salt on non-volatiles | 7.20 | 0.00 | 7.20 | 0.00 | 7.20 | 0.00 | 7.20 | 0.00 |
| General paint properties | | | | | | | | |
| Density (Kg/l) | 1.36 | 1.46 | 1.36 | 1.46 | 1.38 | 1.48 | 1.32 | 1.42 |
| Epoxy/amine | 1.00 | 1.00 | 1.00 | 1.00 | 1.00 | 1.00 | 1.00 | 1.00 |
| Non-volatiles by weight (%) | 74.34 | 76.11 | 74.45 | 76.20 | 74.63 | 76.33 | 73.41 | 75.27 |
| Non-volatiles by volume (%) | 60.75 | 60.75 | 60.70 | 60.73 | 60.56 | 60.56 | 60.57 | 60.57 |
| PVC | 29.90 | 29.60 | 29.80 | 29.80 | 29.52 | 29.50 | 29.50 | 29.50 |
| VOC less water (g/L) | 348.00 | 348.00 | 348.00 | 348.00 | 350.00 | 350.00 | 350.00 | 350.00 |

Sample Preparation:

Component A was prepared according to the following procedure: all components were added in the order displayed in the table (top down) under a high speed dissolver to a 500 ml can. All ingredients were added under stirring. After the addition of the MPA® 2000x, the mixture was dispersed for 10 minutes more having a good dispersing vortex (2,000-3,000 rpm) depending on the viscosity. The temperature should not exceed 70° C. The remaining Epikote® 828 and methyl amyl ketone were added and the formulations were milled with an Eiger® mini motor mill to a fineness of grind of less than 25 μm. Subsequently in the letdown phase, Epikote® 828, methyl amyl ketone, and BYK® 358N were added in this order while stirring the mixture to complete component A. The curing solution component B was prepared separately by mixing with a spatula.

For this example, 2024 T3 clad and bare panels were pre-treated according to method A.

Component B was added to Component A and stirred to a homogeneous mixture. The paints were applied in one wet coat to a dry film thickness of 20-30 μm 30 minutes after mixing. After an overnight cure for 16 hrs and ambient conditions (23±2° C./50±5% RH) a polyurethane-based topcoat Eclipse® (ECL-G-101) was applied in 2 coats with 30 minutes flash-off between coats, achieving a dry film thickness of 60-70 μm.

All samples were cured at 23±2° C./50±5% RH for 7 days before starting the testing.

TABLE 3.2

| | | Adhesion | | | |
|---|---|---|---|---|---|
| | | Adhesion 7 Days (ISO 2409) | | Adhesion after 7 days water immersion | |
| Sample | Description | 2024 T3 Unclad | 2024 T3 Clad | 2024 T3 Unclad | 2024 T3 Clad |
| 3-A | Heucophos ® SRPP/ Lithium carbonate | Gt 0 | Gt 0 | Gt 0 | Gt 0 |
| 3-B | Heucophos ® SRPP | Gt 0 | Gt 0 | Gt 0 | Gt 0 |
| 3-C | Heucophos ® ZPA/ Lithium carbonate | Gt 0 | Gt 0 | Gt 0 | Gt 0 |
| 3-D | Heucophos ® ZPA | Gt 0 | Gt 0 | Gt 0 | Gt 0 |
| 3-E | Magnesium oxide/ Lithium carbonate | Gt 0 | Gt 0 | Gt 0 | Gt 0 |
| 3-F | Magnesium oxide | Gt 0 | Gt 0 | Gt 0 | Gt 0 |

TABLE 3.2-continued

| | | Adhesion | | | |
|---|---|---|---|---|---|
| | | Adhesion 7 Days (ISO 2409) | | Adhesion after 7 days water immersion | |
| Sample | Description | 2024 T3 Unclad | 2024 T3 Clad | 2024 T3 Unclad | 2024 T3 Clad |
| 3-G | Pigmentan ® 465M/ Lithium carbonate | Gt 0 | Gt 0 | Gt 0 | Gt 0 |
| 3-H | Pigmentan ® 465M | Gt 0 | Gt 0 | Gt 0 | Gt 0 | white deposits. This is not uncommon, even technologies using strontium chromate as a corrosion inhibitor show this behaviour in prolonged neutral salt spray exposure. Striking and different from the sample without lithium carbonate is the fact that the samples with lithium carbonate show less white deposits in the scribe, a lower density or thinner layer of white deposits, but still shiny scribes even under the white deposits. This behaviour indicates that the lithium compound provides a protective layer in the scribe to protect the alloy. This observation is significantly different from the state of the art corrosion inhibitors.

TABLE 3.3

| | | Observations after neutral salt spray exposure | | | | | | |
|---|---|---|---|---|---|---|---|---|
| | | 2024 T3 Clad | | | | | | |
| | | 500 hrs NSS | | | | 2,000 hrs NSS | | |
| sample | Inhibitor | Scribe Visual appearance | Corrosion Products % area Scribe | Creep from scribe (mm) | Blisters ASTM D 714 | Scribe Visual Appearance | Corrosion products % area scribe | creep from scribe (mm) | Blisters ASTM D 714 |
| 3-A | Heucophos ® SRPP/ Lithium carbonate | shiny parts | 5% | 0 | 10 | shiny parts | 25% | 1 | 10 |
| 3-B | Heucophos ® SRPP | Dark | 25% | 0 | 10 | Dark | 50% | 1 | 10 |
| 3-C | Heucophos ® ZPA/ Lithium carbonate | shiny parts | 5% | 0 | 10 | shiny parts | 30% | 1 | 10 |
| 3-D | Heucophos ®ZPA | Dark | 25% | 0 | 10 | Dark | 40% | 1 | 10 |
| 3-E | Magnesium oxide/ Lithium carbonate | Shiny | 2% | 0 | 10 | Shiny | 30% | 1 | 10 |
| 3-F | Magnesium oxide | Dark | 20% | 0 | 10 | Dark | 40% | 1 | 10 |
| 3-G | Pigmentan ® 465M/ Lithium carbonate | Shiny | 2% | 0 | 10 | shiny | 30% | 1 | 10 |
| 3-H | Pigmentan ® 465M | Dark | 20% | 0 | 10 | Dark | 50% | 1 | 10 |

All samples containing lithium carbonate show a significantly different scribe appearance compared to the samples without lithium carbonate. After 500 hrs of neutral salt spray exposure shiny scribes with almost no corrosion products were observed, whereas the samples without lithium carbonate showed dark, almost black scribes with significant amounts of corrosion products. The samples containing Heucophos® ZPA and Heucophos® SRPP are less distinct but the addition of lithium carbonate still provides an improvement over samples without this addition. The best and most striking results are found when combining the lithium salt with an anticorrosive pigment based on an oxyaminophosphate salt of magnesium like Pigmentan® 465M or a magnesium oxide. After 2,000 hrs of neutral salt spray the scribes show more Example 4

Utilization of Lithium Carbonate and Lithium Phosphate in a Solvent-Based Epoxy Amine Coating In Example 3 a synergistic effect of lithium carbonate with magnesium oxide and oxyaminophosphate salts of magnesium (Pigmentan® 465M) was observed. This example is to investigate the performance of lithium carbonate and phosphate with and without combination with these magnesium salts.

TABLE 4.1

| | Formulations to obtain 250 ml mixed material | | | | | | | |
|---|---|---|---|---|---|---|---|---|
| | 4-A | 4-B | 4-C | 4-D | 4-E | 4-F | 4-G | 4-H |
| Component A dispersion phase | | | | | | | | |
| Methyl amyl ketone | 20.71 | 20.71 | 20.71 | 20.71 | 20.71 | 20.71 | 20.88 | 20.71 |
| Epikote ® 828 | 10.56 | 10.56 | 10.56 | 10.56 | 10.56 | 10.57 | 10.65 | 10.57 |
| Solsperse ® 32500 | 6.95 | 6.95 | 6.95 | 6.95 | 6.95 | 6.95 | 7.00 | 6.95 |

TABLE 4.1-continued

Formulations to obtain 250 ml mixed material

| | 4-A | 4-B | 4-C | 4-D | 4-E | 4-F | 4-G | 4-H |
|---|---|---|---|---|---|---|---|---|
| Kronos ® 2310 | 40.34 | 40.34 | 40.34 | 40.34 | 40.34 | 40.36 | 40.68 | 40.36 |
| Lithium carbonate | | 22.83 | 22.83 | | | 22.84 | | |
| Lithium phosphate | | | | 27.49 | 27.49 | | 27.72 | |
| Blanc fixe N | 47.62 | | 47.62 | 47.62 | | | | 47.63 |
| Pigmentan ® 465M | | | | | | 22.73 | 22.91 | 22.73 |
| Magnesium oxide | 38.74 | 38.74 | | | 38.74 | | | |
| Wollastocoat ® 10 ES | 37.63 | 37.63 | 37.63 | 37.63 | 37.63 | 37.64 | 37.94 | 37.64 |
| MPA ®-2000X | 2.41 | 2.41 | 2.41 | 2.41 | 2.41 | 2.41 | 2.43 | 2.41 |
| High speed dissolver | | | | | | | | |
| Methyl amyl ketone | 5.96 | 5.96 | 5.95 | 5.95 | 5.95 | 5.94 | 6.00 | 5.94 |
| Epikote ® 828 | 15.28 | 15.28 | 15.28 | 15.28 | 15.28 | 15.29 | 15.41 | 15.29 |
| grinding on mini motor mill | | | | | | | | |
| let down phase | | | | | | | | |
| Epikote ® 828 | 47.55 | 47.55 | 47.55 | 47.55 | 47.55 | 47.55 | 47.06 | 47.55 |
| Methyl amyl ketone | 14.68 | 14.67 | 14.66 | 14.68 | 14.68 | 14.68 | 14.55 | 14.69 |
| BYK ® 358N | 1.24 | 1.24 | 1.24 | 1.24 | 1.24 | 1.24 | 1.23 | 1.24 |
| Component B | | | | | | | | |
| Xylene | 21.98 | 21.98 | 21.98 | 21.98 | 21.98 | 21.98 | 21.89 | 21.98 |
| Ancamide ® 2500 | 51.15 | 51.15 | 51.15 | 51.15 | 51.15 | 51.15 | 50.96 | 51.15 |
| Silquest ® A-1120 Silane | 7.03 | 7.03 | 7.03 | 7.03 | 7.03 | 7.03 | 7.00 | 7.03 |
| Total | 369.83 | 345.05 | 353.92 | 358.57 | 349.70 | 329.06 | 334.32 | 353.85 |
| content Lithium salt | | | | | | | | |
| % Vol. Lithium salt | 0.00 | 7.20 | 7.20 | 7.20 | 7.20 | 7.20 | 7.20 | 0.00 |
| on non-volatiles | | | | | | | | |
| general paint properties | | | | | | | | |
| Density (Kg/L) | 1.48 | 1.38 | 1.42 | 1.43 | 1.40 | 1.32 | 1.34 | 1.42 |
| epoxy/amine | 1.00 | 1.00 | 1.00 | 1.00 | 1.00 | 1.00 | 1.00 | 1.00 |
| Non-volatiles by weight (%) | 76.33 | 74.63 | 75.27 | 75.59 | 74.97 | 73.41 | 73.83 | 75.27 |
| Non-volatiles by volume (%) | 60.56 | 60.56 | 60.56 | 60.56 | 60.56 | 60.57 | 60.56 | 60.57 |
| PVC | 29.50 | 29.52 | 29.50 | 29.50 | 29.50 | 29.50 | 29.70 | 29.50 |
| VOC less water (g/L) | 350.00 | 350.00 | 350.00 | 350.00 | 350.00 | 350.00 | 350.00 | 350.00 |

Sample Preparation:

Component A was prepared according to the following procedure: components (methyl amyl ketone, Solsperse® 32500, Epikote® 828, magnesium oxide, Blanc Fixe N, Wollastocoat® 10ES, Kronos 2310®) were added under a high speed dissolver to a 500 mL tin can. After the addition of the MPA®-2000×, the components were dissolved at 2,000-3,000 rpm to obtain a minimum temperature of 55° C. The temperature was retained for 15 minutes but should not exceed 70° C. The remaining Epikote® 828 epoxy resin and methyl amyl ketone were added before milling. The mixture was milled with an Eiger® mini motor mill to a fineness of grind of 25 μm. After calculation of the yield after milling, component A was completed using the letdown phase. The letdown was added to component A while stirring, obtaining a homogeneous mixture. Component B was prepared separately.

For this example, 2024 T3 clad and bare panels were pretreated according to pretreatment method B.

Component B was been added to component A. The mixture was stirred to a homogeneous mixture. The paints were applied 30 minutes after mixing.

With the use of HVLP spray equipment all formulations were applied in one wet coat to obtain a dry film thickness of 20-30 μm.

After overnight cure at 23±2° C./50±5% RH, a polyurethane-based topcoat Eclipse® (ECL-G-101) was applied in 2 coats with 30 minutes flash-off between coats, achieving a dry film thickness of 60-70 μm. All samples were cured at 23±2° C./50±5% RH for 7 days before testing.

TABLE 4.2

Adhesion

| | | Adhesion 7 Days (ISO 2409) | | Adhesion after 7 days water immersion (ISO 2409) | |
|---|---|---|---|---|---|
| Sample | description | 2024 T3 Unclad | 2024 T3 Clad | 2024 T3 Unclad | 2024 T3 Clad |
| 4-A | MgO | Gt 0 | Gt 0 | Gt 0 | Gt 0 |
| 4-B | MgO/Lithium carbonate | Gt 0 | Gt 0 | Gt 0 | Gt 0 |
| 4-C | Lithium carbonate | Gt 0 | Gt 0 | Gt 0 | Gt 0 |
| 4-D | Lithium phophate | Gt 0 | Gt 0 | Gt 0 | Gt 0 |
| 4-E | MgO/Lithium phosphate | Gt 0 | Gt 0 | Gt 0 | Gt 0 |
| 4-F | Pigmentan ® 465M/ Li2CO3 | Gt 0 | Gt 0 | Gt 0 | Gt 0 |
| 4-G | Pigmentan ® 465M/ Li3PO4 | Gt 0 | Gt 0 | Gt 0 | Gt 0 |
| 4-H | Pigmentan ® 465M | Gt 0 | Gt 0 | Gt 0 | Gt 0 |

TABLE 4.3

Observations after neutral salt spray exposure 1,000 hrs NSS
Pretreatment method B

| sample | Inhibitor | 2024 T3 clad | | | 2024 T3 unclad | | |
|---|---|---|---|---|---|---|---|
| | | Scribe Visual appearance | Creep from scribe (mm) | Blisters ASTM D 714 | Scribe Visual appearance | Creep from scribe (mm) | Blisters ASTM D 714 |
| 4-A | Magnesium oxide | dark | 1 | 10 | dark | 1 | 10 |
| 4-B | Magnesium oxide/ Lithium carbonate | shiny | 1 | 10 | shiny | 0 | 10 |
| 4-C | Lithium carbonate | shiny | 1 | 10 | shiny | 1 | 10 |
| 4-D | Lithium phosphate | dull | 0 | 10 | dull | 0 | 10 |
| 4-E | MgO/Lithium phosphate | shiny | 1 | 10 | dull | 0 | 10 |
| 4-F | Pigmentan ® 465M/ Lithium carbonate | shiny | 1 | 10 | shiny | 0 | 10 |
| 4-G | Pigmentan ® 465M/ Lithium phosphate | shiny | 1 | 10 | shiny | 0 | 10 |
| 4-H | Pigmentan ® 465M | Dark | 1 | 10 | Dark | 0 | 10 |

The samples containing lithium salt show scribes with significantly different appearance compared to the samples without lithium salts. In all cases the samples with lithium show much less corrosion (white) deposits in the scribe and all but one lithium-containing sample show shiny/bright. The samples without lithium 4-A and 4-H show dark scribes with high density corrosion products.

Again lithium phosphate shows a dull but light scribe. This behaviour is different compared to the lithium carbonate samples and is most likely caused by a lower solubility of the lithium phosphate. Despite the dull scribe, no corrosion-induced blisters are found for sample 4-D.

Combination of a lithium salt with a magnesium oxide or Pigmentan® 465M results in shiny scribes (also for the lithium phosphate sample 4-G) and significantly fewer corrosion-induced blisters compared to the samples without lithium salts.

Samples 4C en D also show a higher density of corrosion-induced blisters compared to the samples wherein the lithium salts are combined with magnesium oxide or Pigmentan® 465M.

This demonstrates a synergistic effect when combining the lithium salt with magnesium-based corrosion inhibitors.

Example 5

Level of Lithium Carbonate

Previous examples have demonstrated the activity of lithium-based salts in the neutral salt spray exposure test. This example is intended to demonstrate the activity of lithium carbonate when incorporated at increasing concentration per volume of the dry paint film.

TABLE 5.1

Formulations to obtain 250 ml mixed paint

| | 5-A | 5-B | 5-C | 5-D | 5-E | 5-F | 5-G |
|---|---|---|---|---|---|---|---|
| Component A | | | | | | | |
| METHYLAMYLKETONE | 40.71 | 40.71 | 40.71 | 40.72 | 40.71 | 40.71 | 39.85 |
| Solsperse ® 32500 | 6.94 | 6.94 | 6.94 | 6.94 | 6.94 | 6.94 | 6.79 |
| Epikote ® 828 | 73.31 | 73.31 | 73.31 | 73.31 | 73.31 | 73.31 | 71.76 |
| Lithium Carbonate | 0.00 | 1.57 | 4.72 | 15.73 | 31.45 | 62.90 | 92.36 |
| Blanc Fixe N | 39.10 | 38.36 | 36.88 | 31.65 | 24.29 | 9.47 | 0.00 |
| Magnesium oxide | 31.81 | 31.21 | 30.01 | 25.75 | 19.76 | 7.70 | 0.00 |
| Wollastocoat ® 10 ES | 62.50 | 61.32 | 58.96 | 50.60 | 38.83 | 15.13 | 0.00 |
| Kronos ® 2310 | 25.38 | 25.38 | 25.38 | 25.39 | 25.38 | 25.38 | 24.84 |
| MPA ®-2000X | 2.41 | 2.41 | 2.41 | 2.41 | 2.41 | 2.41 | 2.35 |
| BYK ® 358N | 1.24 | 1.24 | 1.24 | 1.24 | 1.24 | 1.24 | 1.21 |
| Component B | | | | | | | |
| Xylene | 21.95 | 21.95 | 21.95 | 21.96 | 21.95 | 21.95 | 21.49 |
| Ancamine ® 2500 | 51.09 | 51.09 | 51.09 | 51.10 | 51.09 | 51.09 | 50.01 |
| Silquest ® A-1120 Silane | 7.02 | 7.02 | 7.02 | 7.02 | 7.02 | 7.02 | 6.87 |
| total | 363.46 | 362.51 | 360.60 | 353.81 | 344.37 | 325.24 | 317.56 |

TABLE 5.1-continued

| Formulations to obtain 250 ml mixed paint | | | | | | | |
|---|---|---|---|---|---|---|---|
| | 5-A | 5-B | 5-C | 5-D | 5-E | 5-F | 5-G |
| content Lithium salt | | | | | | | |
| % Vol. Lithium salt on non-volatiles | 0 | 0.5 | 1.5 | 5 | 10 | 20 | 30 |
| general paint properties | | | | | | | |
| Density (Kg/l) | 1.45 | 1.45 | 1.44 | 1.42 | 1.38 | 1.30 | 1.27 |
| epoxy/amine | 1.00 | 1.00 | 1.00 | 1.00 | 1.00 | 1.00 | 1.00 |
| Non-volatiles by weight (%) | 76.12 | 76.05 | 75.92 | 75.46 | 74.79 | 73.30 | 73.24 |
| Non-volatiles by volume (%) | 60.90 | 60.90 | 60.90 | 60.90 | 60.90 | 60.90 | 61.70 |
| PVC | 30.00 | 30.00 | 30.00 | 30.00 | 30.00 | 30.00 | 32.39 |
| VOC less water (g/L) | 347 | 347 | 347 | 347 | 347 | 347 | 340 |

Sample Preparation:

Component A was prepared according to the following procedure: all components were added under stirring to a 370 ml glass jar. After the addition of the final component, 400 grams of Zirconox® pearls (1.7-2.4 mm) were added to the mixture. The salts were dispersed to a particle size smaller than 25 μm by shaking for 20 minutes on a Skandex® shaker. Before continuing, the mixtures were filtered to remove the grinding media. Component B was prepared separately.

For this example 2024 T3 bare and 2024 T3 clad panels were prepared according to pretreatment method A.

Component B was added to component A and the mixture was stirred to a homogeneous mixture. 30 minutes after mixing the paints were applied in one wet coat to a dry film thickness of 20-30 μm. After overnight cure at ambient conditions 23±2° C./50±5% RH, a polyurethane-based topcoat Eclipse® (ECL-G-101) was applied in 2 coats with 30 minutes flash-off, achieving a dry film thickness of 60-70 μm.

Before starting the neutral salt spray test, the samples were cured at 23±2° C./50±5% RH for 7 days.

significant amounts of corrosion products and creep from the scribe were observed. At concentrations of 5% and higher up to 30% by volume, shiny and bright scribes were found. This combined with very minimal formation of corrosion products in the scribe and the absence of creep from the scribe clearly indicated a passivation effect of the lithium salt, in this case lithium carbonate. Despite the high loading of the salts no osmotic blistering was observed.

Example 6

Activity in Solvent Based Polyurethane Technology

The example is intended to demonstrate that the activity in lithium-based salts is not limited to the application in epoxy amine technology. The example describes the incorporation and activity of lithium carbonate into a polyurethane-based coating.

TABLE 5.2

| Observations after 500 hrs neutral salt spray exposure. | | | | | | | | | |
|---|---|---|---|---|---|---|---|---|---|
| | | 500 hrs Neutral salt spray (ASTM B117) | | | | | | | |
| | | 2024 T3 unclad | | | | 2024 T3 clad | | | |
| sample | Vol-% Lithium carbonate* | Scribe Visual appearance | Corrosion Products % area scribe | Creep from scribe | Blisters ASTM D-714 | Scribe Visual Appearance | Corrosion products % area scribe | creep from scribe | Blisters ASTM D-714 |
| 5-A | 0 | Black | 20% | 2 mm | 10 | Black | 15% | 2 mm | 10 |
| 5-B | 0.5 | shiny parts | 10% | 1.5 mm | 10 | Shiny parts | 15% | 1 mm | 10 |
| 5-C | 1.5 | shiny parts | 10% | 3 mm | 10 | Shiny | 10% | 0 mm | 10 |
| 5-D | 5 | shiny | 5% | 1 mm | 10 | Shiny | 2% | 0 mm | 10 |
| 5-E | 10 | shiny | 2% | 0 mm | 10 | Shiny | 2% | 0 mm | 10 |
| 5-F | 20 | shiny | <2% | 0 mm | 10 | Shiny | 2% | 0 mm | 10 |
| 5-G | 30 | shiny | <2% | 0 mm | 10 | Shiny | 2% | 0 mm | 10 |

*based on the sum of the volumes of the non-volatile components

At low concentrations such as 0.5 and 1.5 volume-%, based on the sum of the volumes of the non-volatile components, shiny and bright areas were observed in the scribe. However, Because adhesion on aluminium alloys is generally poorer compared to the epoxy binder system, it was decided to use PreKote® and anodized substrate as a pretreatment.

TABLE 6.1

Formulations to obtain 250 ml mixed paint

|  | 6-A | 6-B |
|---|---|---|
| Component A | | |
| N-Butyl acetate | 35.61 | 35.61 |
| Desmophen ® 1100 | 62.67 | 62.67 |
| Solsperse ® 32500 | 7.49 | 7.49 |
| Magnesium oxide | 30.11 | 30.10 |
| Wollastocoat ® 10 ES | 18.56 | 18.56 |
| Lithium Carbonate |  | 17.74 |
| Blanc Fixe N (barium sulphate) | 36.92 |  |
| Kronos ® 2310 | 43.68 | 43.68 |
| MPA ®-2000X | 3.31 | 3.31 |
| Component B | | |
| N-Butyl acetate | 57.23 | 57.23 |
| Tolonate ® HDT-LV | 48.53 | 48.52 |
| Dynasilan ® GLYMO | 3.96 | 3.96 |
| General paint properties | | |
| Density (Kg/L) | 1.39 | 1.315 |
| NCO/OH | 1.1 | 1.1 |

TABLE 6.1-continued

Formulations to obtain 250 ml mixed paint

|  | 6-A | 6-B |
|---|---|---|
| Non-volatiles by weight (%) | 71.27 | 69.6 |
| Non-volatiles by volume (%) | 54.59 | 54.59 |
| PVC | 25 | 25 |
| VOC less water (g/l) | 400 | 400 |

Sample Preparation:

Component A was prepared according the following procedure: all components were added under stirring to a 370 ml glass jar. After the addition of the final component, 400 grams of Zirconox® pearls (1.7-2.4 mm) were added to the mixture. The salts were dispersed to a particle size smaller than 25 μm by shaking for 10 to 20 minutes on a Skandex® shaker. After shaking the mixtures were filtered to remove the grinding media.

For this example 2024 T3 clad and bare panels were prepared according to pretreatment method C. The panels with chromic acid anodization (CAA) were prepared externally.

Component B was added to component A and the mixture was stirred to a homogeneous mixture. 30 minutes after mixing the paints were applied in one wet coat to a dry film thickness of 20-30 μm.

After overnight cure a polyurethane-based topcoat Eclipse® (ECL-G-101) was applied in 2 coats with 30 minutes flash-off between coats, achieving a dry film thickness of 60-70 μm. All samples were cured at 23±2° C./50±5% RH for 7 days.

TABLE 6.2

Adhesion

|  |  | 2024 T3 clad | | 2024 T3 unclad | |
|---|---|---|---|---|---|
| Sample | Description | PreKote ® | CAA | PreKote ® | CAA |
| 6-A | Barium Sulphate | Gt 0 | Gt 0 | Gt 0 | Gt 0 |
| 6-B | Lithium Carbonate | Gt 0 | Gt 0 | Gt 0 | Gt 0 |

TABLE 6.3

Observations after neutral salt spray exposure 500 hrs Neutral salt spray (ASTM B117) Pretreatment C

| | | 2024 T3 clad (PreKote) | | | | 2024 T3 Bare (PreKote ®) | | | |
|---|---|---|---|---|---|---|---|---|---|
| sample | Description | Scribe visual appearance | corrosion products % area scribe | corrosion creep from scribe | Blisters | Scribe visual appearance | corrosion products % area scribe | Corrosion creep from scribe | blisters |
| 6-A | Barium Sulphate | Black | 25% | 2 mm | 10 | black | 50% | 3.5 mm | 10 |
| 6-B | Lithium Carbonate | Shiny | 1% | 0.6 mm | 10 | shiny | 0% | 0 mm | 10 |

| | | 2024 T3 clad CAA | | | | 2024 T3 Bare CAA | | | |
|---|---|---|---|---|---|---|---|---|---|
| sample | Description | Scribe visual appearance | corrosion products % area scribe | corrosion creep from scribe | Blisters | Scribe visual appearance | corrosion products % area scribe | Corrosion creep from scribe | blisters |
| 6-A | Barium Sulphate | black | 25% | 0.6 | 10 | black | 15% | 0.4 | 10 |
| 6-B | Lithium Carbonate | shiny | <2% | 0.3 | 10 | shiny | 1% | 0 | 10 |

The samples containing lithium carbonate showed clearly shiny scribes after 500 hrs of neutral salt spray exposure. Compared to the uninhibited sample, the lithium carbonate samples showed a much lower corrosion product concentration in the scribe and limited to no creep or corrosion-induced blistering from the scribe. Despite the level of soluble material in the formulation no blistering was observed on the face of the panel.

These results confirm the inhibitive effect (bright shiny scribes and low levels of corrosion products) of lithium carbonate in a polyurethane formulation.

Example 7

Activity in Solvent-Based Polyaspartic Technology

Epoxy amine and polyurethane paint technology are very well known in the 2 component paint technology. One of the newer technologies is the polyaspartic paint technology. In this technology hindered amines are crosslinked with isocyanate hardeners to obtain a crosslinked paint film. The technology is used as primer, topcoat or direct to metal applications (priming topcoat). The example demonstrates the activity of lithium salts like lithium carbonate in this technology.

TABLE 7.1

Formulations to obtain 250 mL mixed paint

|  | 7-A | 7-B |
|---|---|---|
| Component A |  |  |
| N-Butyl acetate | 35.50 | 35.50 |
| Desmophen ® NH 1520 | 42.56 | 42.56 |
| Desmophen ® VPLS 2142 | 13.59 | 13.59 |
| Solsperse ® 32500 | 8.26 | 8.26 |
| Magnesium oxide | 33.21 | 33.21 |
| Wollastocoat ® 10 ES | 20.47 | 20.47 |
| Lithium Carbonate |  | 19.58 |
| Blanc Fixe N (barium sulphate) | 40.82 |  |
| UOP ® L Powder | 9.89 | 9.89 |
| Kronos ® 2310 | 48.19 | 48.19 |
| MPA ®-2000X | 2.89 | 2.89 |
| BYK ® 358N | 7.68 | 7.68 |
| Component B |  |  |
| N-Butyl acetate | 41.09 | 41.09 |
| Tolonate ® HDT-LV | 47.97 | 47.97 |
| Dynasilan ® GLYMO | 2.81 | 2.81 |
| content Lithium salt |  | 333.68 |
| % Vol. Lithium salt in Dry Film | 0.00 | 6.20 |

TABLE 7.1-continued

Formulations to obtain 250 mL mixed paint

|  | 7-A | 7-B |
|---|---|---|
| general paint properties |  |  |
| Density (Kg/L) | 1.42 | 1.34 |
| NCO/NH | 1.00 | 1.00 |
| Non-volatiles by weight (%) | 75.34 | 73.76 |
| Non-volatiles by volume (%) | 60.24 | 60.24 |
| PVC | 25.00 | 25.00 |
| VOC less water (g/l) | 350.00 | 350.00 |

Sample Preparation:

Component A was prepared according to the following procedure: all components were added under stirring to a 370 ml glass jar. After the addition of the final component, 400 grams of Zirconox® pearls (1.7-2.4 mm) were added to the mixture. The salts were dispersed to a particle size smaller than 25 μm by shaking for 10 to 20 minutes on a Skandex® shaker. After shaking the mixtures were filtered to remove the grinding media.

Component B was prepared separately.

This technology has a moderate adhesion on aluminium alloys. Therefore, for this example, 2024 T3 clad and bare panels were prepared according to pretreatment C. In addition, panels with chromic acid anodization (CAA) were prepared externally.

Component B was added to component A and the mixture was stirred to a homogeneous mixture. 30 minutes after mixing the paints were applied in one wet coat to a dry film thickness of 20-30 μm. After overnight cure a polyurethane-based topcoat Eclipse® (ECL-G-101) was applied in 2 coats with 30 minutes flash-off between coats, achieving a dry film thickness of 60-70 μm. All samples were cured at 23±2° C./50±5% RH for 7 days

TABLE 7.2

Observations after neutral salt spray exposure 500 hrs Neutral salt spray (ASTM B117)

| | | 2024 T3 clad (PreKote ®) | | | | 2024 T3 Bare (PreKote ®) | | | |
|---|---|---|---|---|---|---|---|---|---|
| sample | Description | Scribe Visual appearance | corrosion products % area scribe | Corrosion creep from scribe | Blisters ASTM D 714 | Scribe Visual appearance | corrosion products % area scribe | Corrosion creep from scribe | Blisters ASTM D 714 |
| 7-A | Barium Sulphate | Black | 10% | 1.0 mm | 10 | Black | 20% | 2.0 mm | 10 |
| 7-B | Lithium Carbonate | Shiny | 1% | 0 mm | 10 | Shiny | 2% | 0 mm | 10 |

| | | 2024 T3 clad CAA | | | | 2024 T3 Bare CAA | | | |
|---|---|---|---|---|---|---|---|---|---|
| sample | Description | Scribe Visual appearance | corrosion products % area scribe | Corrosion creep from scribe | Blisters ASTM D 714 | Scribe Visual appearance | corrosion products % area scribe | Corrosion creep from scribe | Blisters ASTM D 714 |
| 7-A | Barium Sulphate | Black | 40% | 0.5 | 10 | Black | 10% | 0.3 | 10 |
| 7-B | Lithium Carbonate | Shiny | <2% | 0.2 | 10 | Shiny | 1% | 0 | 10 |

This example again demonstrates the beneficial effect of lithium carbonate. Addition of the lithium salt resulted in a reduced number and size of corrosion-induced blisters along the scribe. All samples demonstrated a shiny scribe after neutral salt spray exposure compared to the uninhibited samples. This indicates that the lithium salt is essential to obtain a protective layer in the scribe. This protective effect is not limited to epoxy-amine and polyurethane technology. It is observed in a polyaspartic coating formulation as well.

Example 8

Lithium Salts in Water-Based Epoxy Amine Technology

This example demonstrates the use and activity of lithium salts in a water-based epoxy amine composition. Both lithium phosphate and lithium carbonate are compared to a formulation based on barium sulphate. Passivating activity is demonstrated using lithium carbonate and lithium phosphate.

TABLE 8.1

Formulations for 250 ml mixed paint.

| | Formulations | | |
|---|---|---|---|
| | 8-A | 8-B | 8-C |
| Component A | | | |
| Water, demineralized | 23.45 | 34.20 | 34.20 |
| Disperbyk ®-190 | 2.56 | 4.33 | 4.33 |
| Foamstar ® A-10 | 0.79 | 0.78 | 0.78 |
| Surfynol ® 420 | 0.95 | 0.94 | 0.94 |
| Finntalc ® M 15 E | 21.69 | 21.55 | 21.55 |
| Kronos ® 2310 | 31.54 | 31.34 | 31.34 |
| Blanc Fixe N (barium, Sulphate) | 34.70 | | |
| Lithium carbonate | | 16.53 | |
| Lithium Phosphate | | | 19.90 |
| Grinding with minimotor mill to Fineness of grind <25 µm and under stirring | | | |
| Ancarez ® AR555 | 122.91 | 121.15 | 121.15 |
| Coat-O-Sil ® 1770 | 1.76 | 1.73 | 1.73 |
| Water, demineralized | 8.10 | 25.31 | 25.31 |
| Component B | | | |
| Anquamine ® 419 | 33.59 | 33.11 | 33.11 |
| Dowanol ® PM glycol ether | 9.72 | 9.58 | 9.58 |
| Water, demineralized | 9.21 | 6.03 | 6.03 |
| add before application | | | |
| Water, demineralized | 24.03 | 0.00 | 0.00 |
| basic paint parameters | | | |
| Density (kg/L) | 1.3 | 1.23 | 1.24 |
| epoxy/amine ratio | 0.85 | 0.85 | 0.85 |
| Non-volatiles by weight (%) | 55.21 | 52.3 | 52.819 |
| Non-volatiles by volume (%) | 41.14 | 40.87 | 40.87 |
| PVC % | 23 | 23 | 23 |
| VOC DRY | 148 | 147 | 147 |
| % Lithium salt by Vol. (non volatiles) | 0 | 7.7 | 7.7 |

Sample Preparation:

Component A was prepared according to the following procedure: all components were added under a high speed dissolver to a 500 ml can. All ingredients were added under stirring. After the addition of the barium sulphate, lithium carbonate or lithium phosphate, the mixture was dispersed for 10 minutes under a high speed dissolver having a good dispersing vortex (2,000-3,000 rpm) depending on the viscosity. The fineness of grind of the barium sulphate sample (formulation A) was already less than 25 µm after the high speed dissolver process. The other formulations were milled with an Eiger® mini motor mill to achieve a fineness of grind of less than 25 µm. Subsequently, Ancarez® AR555, demineralized water, and Coat-O-Sil® 1770 were added in this order while stirring the mixture to complete component A. The curing solution (component B: Anquamine® 419, Dowanol® PM glycol ether, and demineralized water) was prepared separately by adding the ingredients while stirring.

For this example 2024 T3 bare and clad panels were prepared using pretreatment method A. In addition, externally prepared 2024 T3 bare CAA (chromic acid anodized) panels were used as well.

Component B was added to Component A while stirring to obtain a homogeneous mixture. 30 minutes after mixing the paints were applied in one wet coat to a dry film thickness of 20-30 µm. The panels were cured by means of a forced cure cycle of 30 minutes at 80° C. in a forced draft oven after a flash-off period of 30 minutes after application to ensure good film formation. After the cooling period of 30 minutes, a polyurethane-based topcoat Eclipse® (ECL-G-101) was applied in 2 coats with 30 minutes flash-off between coats, achieving a dry film thickness of 60-70 µm.

All samples were cured at 23±2° C./50±5% RH for 7 days before starting the testing.

TABLE 8.2

Observations after 500 hrs neutral salt spray exposure 500 hrs Neutral salt spray (ASTM B117)

2024 T3 unclad

| sample | Description | Scribe Visual appearance | Corrosion Products % area Scribe | Creep from Scribe (mm) | Blisters ASTM D 714 |
|---|---|---|---|---|---|
| 8-A | Barium Sulphate | black | 30% | 4.5 mm | 10 |
| 8-B | Lithium Carbonate | shiny | 5% | 0 mm | 8 F |
| 8-C | Lithium Phosphate | Dull/shiny | 10% | 0 mm | 10 |

500 hrs Neutral salt spray (ASTM B117)

2024 T3 Clad

| sample | Description | Scribe Visual Appearance | Corrosion Products % area scribe | creep from scribe (mm) | Blistering ASTM D 714 |
|---|---|---|---|---|---|
| 8-A | Barium Sulphate | Black | 50% | 4.5 mm | 10 |
| 8-B | Lithium Carbonate | Shiny | 2% | 0 mm | 10 |
| 8-C | Lithium Phosphate | Dull/shiny | 10% | 0 mm | 10 |

500 hrs Neutral salt spray (ASTM B117)

2024 T3 bare CAA

| sample | Description | Scribe Visual appearance | Corrosion Products % area scribe | creep from scribe (mm) | Blistering ASTM D 714 |
|---|---|---|---|---|---|
| 8-A | Barium Sulphate | black | 15% | 0.5 mm | 10 |
| 8-B | Lithium Carbonate | Shiny | None | 0 mm | 10 |
| 8-C | Lithium Phosphate | Dull/Shiny | None | 0 mm | 10 |

The samples containing lithium salts show shiny scribes after neutral salt spray exposure on all substrates. This together with an improved resistance to corrosion-induced blistering provides passivation and thus protection to the scribe. As observed in solvent-based paint formulations, the lithium salts also show their protective and active nature in water-based systems.

Example 9

Application of Lithium Carbonate in Water-Based PUR Technology

This example demonstrates the activity of a lithium salt like lithium carbonate in a water-based polyurethane formulation. Two water-based resins were tested.

TABLE 9.1

Formulations for 250 ml paint.

|  | 9-A | 9-B | 9-C | 9D |
|---|---|---|---|---|
| Macrynal ® VSM 6299w/42WA | 123.08 | 108.09 | | |
| NeoCryl ® XK-103 | | | 125.49 | 109.97 |
| Dispersion phase | | | | |
| Water, demineralized | 27.32 | 7.04 | 27.70 | 7.11 |
| Disperbyk ® 190 | 2.99 | 42.24 | 3.03 | 42.68 |
| Foamstar ® A-10 | 0.92 | 5.35 | 0.93 | 5.40 |
| Surfynol ® 420 | 1.11 | 0.96 | 1.12 | 0.97 |
| Finntalc ® M 15 E | 25.27 | 26.61 | 25.61 | 26.88 |
| Kronos ® 2310 | 36.76 | 38.70 | 37.25 | 39.10 |
| Blanc fixe N (barium sulphate) | 40.44 | | 40.98 | |
| Lithium Carbonate | | 20.42 | | 20.63 |
| add under stirring | | | | |
| Dowanol ® PPH glycol ether | 6.29 | 5.53 | 6.93 | 6.07 |
| Dowanol ® DPnB | 6.29 | 5.53 | 6.93 | 6.07 |
| BYK ® 46 | 0.08 | 0.07 | 0.09 | 0.08 |
| component B | | | | |
| Tolonate ® HDT LV 2 | 15.12 | 13.28 | 12.83 | 11.24 |
| Bayhydur ® XP 2655 | 15.12 | 13.28 | 12.83 | 11.24 |
| Dynasilan ® GLYMO | 1.51 | 1.33 | 1.28 | 1.12 |
| PM acetate | 7.56 | 6.64 | 6.412 | 5.62 |
| added water before application | | | | |
| Water, demineralized | 25.36 | 22.26 | 24.25 | 21.25 |
| total | 335.21 | 317.32 | 333.65 | 315.43 |
| General paint properties | | | | |
| Density (Kg/L) | 1.34 | 1.27 | 1.33 | 1.26 |
| NCO/OH | 1.30 | 1.30 | 1.3 | 1.3 |
| Non-volatiles by weight (%) | 55.52 | 55.21 | 56.85 | 56.43 |
| Non-volatiles by volume (%) | 41.62 | 43.98 | 42.12 | 44.45 |
| PVC | 26.50 | 26.40 | 26.5 | 26.4 |
| VOC less water (g/L) | 211.00 | 207.09 | 167 | 170 |
| % Vol Lithium salt on non-volatiles | 0.00 | 8.84 | 0 | 8.82 |

Sample Preparation:

Component A was prepared according to the following procedure: Prior to the addition under stirring, the dispersion phase was prepared. All components were added under a high speed dissolver to a 500 ml can. The ingredients were added under stirring. After addition of the barium sulphate or lithium carbonate, the mixture was dispersed for 10 minutes using a high speed dissolver having a good dispersing vortex (2,000-3,000 rpm) depending on the viscosity. The fineness of grind of the barium sulphate dispersion (formulations 9-A and 9-B) was already less than 25 μm after the high speed dissolver process. The other formulation was milled with an Eiger® mini motor mill using Zirconox® milling beads (1.7-2.4 mm) to achieve a fineness of grind of less than 25 μm. After the addition of the dispersion phase to the resin the final components of Component A were added to the mixture while stirring. The hardener (Component B) was prepared separately by adding the individual components while stirring.

For this example 2024 T3 clad panels were prepared using pretreatment method A. In addition to this externally prepared 2024 T3 clad CAA (chromic acid anodized) panels were used as well.

While mixing hardener component B was added to Component A. When homogeneous, the demineralized water was added under stirring to reduce the viscosity of the mixture. 30 minutes after mixing the paints were applied in a single wet coat to obtain a dry film thickness of 20-30 μm.

To ensure proper film formation, the systems were cured by means of a forced cure cycle of 30 minutes at 80° C. in a forced draft oven after a flash-off period of 30 minutes after application. After a cooling period of 30 minutes, a polyurethane-based topcoat Eclipse® (ECL-G-101) was applied in 2 coats with 30 minutes flash-off between coats, achieving a dry film thickness of 60-70 μm.

All samples were cured at 23±2° C./50±5% RH for 7 days before starting the testing.

TABLE 9.2

Observations after neutral salt spray exposure 500 hrs Neutral salt spray (ASTM B117)

2024 T3 Clad

| sample | Description | Scribe Visual Appearance | Corrosion Products (% area Scribe) | Creep from scribe (mm) | Blisters ASTM D 714 |
|---|---|---|---|---|---|
| 9-A | Barium Sulphate | Black | 50% | 4.5 mm | 10 |
| 9-B | Lithium Carbonate | Shiny | 2% | 0.0 mm | 10 |
| 9-C | Barium Sulphate | Black | 75% | 5.0 mm | 10 |
| 9-D | Lithium Carbonate | Shiny | 0% | 0.0 mm | 10 |

500 hrs Neutral salt spray (ASTM B117)

2024 T3 Clad CAA

| sample | Description | Scribe Visual Appearance | Corrosion products (% area Scribe) | creep from scribe (mm) | Blistering ASTM D 714 |
|---|---|---|---|---|---|
| 9-A | Barium Sulphate | Black | 25% | 0.5 mm | 10 |
| 9-B | Lithium Carbonate | shiny | 1% | 0.0 mm | 10 |
| 9-C | Barium Sulphate | Black | 30% | 1.0 mm | 10 |
| 9-D | Lithium Carbonate | Shiny | 1% | 0.0 mm | 10 |

These results clearly demonstrate a passivating effect of the lithium carbonate. Whereas the uninhibited samples show rapid darkening of the scribe and build-up of corrosion products in the scribe, the samples containing lithium carbonate show bright and shiny scribes with little or no formation of corrosion products. This protective behaviour is also obvious from the fact that the samples with lithium carbonate show no extended corrosion.

The addition of these soluble salts to water-based formulations would be expected to result in very blistering-sensitive formulations. The addition of lithium carbonate did not result in blistering but helps to protect the substrate. In addition to the activity in solvent-based and water-based epoxybased formulations, lithium salts can also be added to water-based polyurethane formulations. The example demonstrates that the type of water-based resin does not have an effect on the performance.

Example 10

Activity of Formulations Containing Lithium Salts Over Various Chrome-Free Pretreatments Over the years, several chrome-free pretreatments and chemical conversion coatings have been developed to replace hexavalent chrome-containing pretreatments. The pretreatments and conversion coatings are designed to provide protection to the aluminium alloy. It is of prime importance that a coating formulation adheres well to such a pretreatment. This example is intended to demonstrate that the lithium salt-based formulations are compatible with these pretreatments, having no negative effect in terms of adhesion and osmotic blistering.

TABLE 10.1

| Formulations to obtain 250 ml mixed material | | | |
|---|---|---|---|
|  | 10-A | 10-B | 10-C |
| Component A | | | |
| Dispersion phase | | | |
| Methyl amyl ketone | 20.71 | 20.71 | 20.71 |
| Epikote ® 828 | 10.56 | 10.56 | 10.57 |
| Solsperse ® 32500 | 6.95 | 6.95 | 6.95 |
| Kronos ® 2310 | 40.34 | 40.34 | 40.36 |
| Lithium carbonate |  | 22.83 | 22.84 |
| Blanc fixe N | 47.62 |  |  |
| Pigmentan ® 465M |  |  | 22.73 |
| Magnesium oxide | 38.74 | 38.74 |  |
| Wollastocoat ® 10 ES | 37.63 | 37.63 | 37.64 |
| MPA ®-2000X | 2.41 | 2.41 | 2.41 |
| High speed dissolver | | | |
| Methyl amyl ketone | 5.96 | 5.96 | 5.94 |
| Epikote ® 828 | 15.28 | 15.28 | 15.29 |
| Grinding on mini motor mill | | | |
| let down phase | | | |
| Epikote ® 828 | 47.55 | 47.55 | 47.55 |
| Methyl amyl ketone | 14.68 | 14.67 | 14.68 |
| BYK ® 358N | 1.24 | 1.24 | 1.24 |
| Component B | | | |
| Xylene | 21.98 | 21.98 | 21.98 |
| Ancamide ® 2500 | 51.15 | 51.15 | 51.15 |
| Silquest ® A-1120 Silane | 7.03 | 7.03 | 7.03 |
| Total | 369.83 | 345.05 | 329.06 |

TABLE 10.1-continued

| Formulations to obtain 250 ml mixed material | | | |
|---|---|---|---|
|  | 10-A | 10-B | 10-C |
| content Lithium salt | | | |
| % Vol Lithium salt on non-volatiles | 0.00 | 7.20 | 7.20 |
| general paint properties | | | |
| Density (Kg/l) | 1.48 | 1.38 | 1.32 |
| Epoxy/amine | 1.00 | 1.00 | 1.00 |
| Non-volatiles by weight (%) | 76.33 | 74.63 | 73.41 |
| Non-volatiles by volume (%) | 60.56 | 60.56 | 60.57 |
| PVC | 29.50 | 29.52 | 29.50 |
| VOC less water (g/L) | 350.00 | 350.00 | 350.00 |

Sample Preparation:

Component A was prepared according to the following procedure: components of the dispersion phase (methyl amyl ketone, Solsperse® 32500, Epikote® 828 epoxy resin, magnesium oxide, Blanc Fixe N, Wollastocoat® 10ES, Kronos® 2310, and MPA®-2000×) were added under a high speed dissolver to a 500 mL tin can. After the addition, the components were dissolved (2,000-3,000 rpm) to obtain a temperature of 55° C. The temperature was retained for 15 minutes, not exceeding 70° C. The remaining Epikote® 828 epoxy resin and methyl amyl ketone were added before milling. The mixture was milled with an Eiger® mini motor mill to obtain 25 μm fineness of grind. After calculation of the yield after dispersion, component A was completed using the letdown phase. The letdown was added to complete component A while stirring, obtaining a homogeneous mixture.

All pretreatments were applied according to the technical data sheet (when applicable). In the case of 2024 T3 clad substrate processes are described in the paragraph discussing panel pretreatment.

Method A: Scotch Brite®/Solvent Cleaning
Method B: Sol gel application
Method C: PreKote® application
Method D: SurTec® 650 RTU Finally 2024 T3 clad TSA panels were tested as well.

TSA is a chrome-free anodization process based on tartaric sulphuric aid which is executed by an external company.

Component B was added to component A. The mixture was stirred to a homogeneous mixture. The paints were applied 30 minutes after mixing.

All formulations were applied in one wet coat to obtain a dry film thickness of 20-30 μm.

After overnight cure at 23±2° C./50±5% RH, a polyurethane-based topcoat Eclipse® (ECL-G-101) was applied in 2 coats with 30 minutes flash-off between coats, achieving a dry film thickness of 60-70 μm. All samples were cured at 23±2° C./50±5% RH for 7 days before testing.

TABLE 10-2

| Adhesion on 2024 T3 clad panels using different pretreatments | | | | | | |
|---|---|---|---|---|---|---|
|  | 10-A Magnesium oxide | | 10-B Magnesium Oxide/ Lithium carbonate | | 10-C Pigmentan ® 465 M/ Lithium carbonate | |
| pretreatment | initial | 7 days water | Initial | 7 days water | initial | 7 days water |
| Scotch-brited | Gt 0 | Gt 0 | Gt 0 | Gt 1 | Gt 0 | Gt 0 |
| AC-131 | Gt 0 | Gt 0 | Gt 0 | Gt 0 | Gt 0 | Gt 0 |
| PreKote ® | Gt 0 | Gt 0 | Gt 0 | Gt 0 | Gt 0 | Gt 0 |
| SurTec ® 650 | Gt 0 | Gt 2 | Gt 0 | Gt 2 | Gt 0 | Gt 0 |
| TSA | Gt 0 | Gt 2 | Gt 0 | Gt 0 | Gt 0 | Gt 0 |

TABLE 10-3

1000 hrs Neutral salt spray exposure.
Appearance of scribe and osmotic blistering in NSS on 2024 T3

|  | 10-A Magnesium oxide | | 10-B Magnesium Oxide/ Lithium carbonate | | 10-C Pigmentan ® 465 M/ Lithium carbonate | |
| --- | --- | --- | --- | --- | --- | --- |
|  | Scribe appearance | Blistering | Scribe appearance | Blistering | Scribe appearance | Blistering |
| Scotch brited | Dark | 10 | Shiny | 10 | Shiny | 10 |
| AC-131 | Dark | 10 | Shiny | 10 | Shiny | 10 |
| PreKote | Dark | 10 | Shiny | 10 | Shiny | 10 |
| SurTec ® 650 | Dark | 10 | Shiny | 10 | Shiny | 10 |
| TSA | Dark | 10 | Shiny | 10 | Shiny | 10 |

All samples show sufficient adhesion to the different pretreatments at initial stage and after 7 days immersion in water. After 1,000 hrs of neutral salt spray exposure shiny scribes were observed for the lithium salt-containing formulations. This suggests that the different pretreatments do not interfere with the passivation mechanism of the lithium salts in the scribe. No osmotic blistering was observed on the face side of the panels during or after immersion in water or neutral salt spray exposure.

Coatings containing lithium salts are compatible with these chrome-free pretreatments and chemical conversion coatings.

Example 11

Activity Over Non Ferrous Substrates

The example demonstrates that the addition of a lithium salt not only shows activity over 2024 T3 alloys. Other alloys were investigated as well.

The coating compositions were prepared according to the method described in Example 10.

All alloys were prepared with the AC-131 pre-treatment (pretreatment method B).

Component B was added to component A. The mixture was stirred to a homogeneous mixture. The paints were applied 30 minutes after mixing.

All formulations were applied in one wet coat to obtain a dry film thickness of 20-30 µm.

After overnight cure at 23±2° C./50±5% RH, a polyurethane-based topcoat Eclipse® (ECL-G-101) was applied in 2 coats with 30 minutes flash-off between coats, achieving a dry film thickness of 60-70 µm. All samples were cured at 23±2° C./50±5% RH for 7 days before testing.

TABLE 11-1

Adhesion on various aluminium alloys bare

|  | 10-A Magnesium oxide | | 10-B Magnesium Oxide/ Lithium carbonate | | 10-C Pigmentan ® 465 M/ Lithium carbonate | |
| --- | --- | --- | --- | --- | --- | --- |
|  | initial | 7 days water | Initial | 7 days water | Initial | 7 days water |
| 2024 T3 bare | Gt 0 | Gt 0 | Gt 0 | Gt 0 | Gt 0 | Gt 0 |
| 2024 T3 Clad | Gt 0 | Gt 0 | Gt 0 | Gt 0 | Gt 0 | Gt 0 |
| 7075 T6 Clad | Gt 0 | Gt 0 | Gt 0 | Gt 0 | Gt 0 | Gt 0 |
| 7075 T6 Bare | Gt 0 | Gt 0 | Gt 0 | Gt 0 | Gt 0 | Gt 0 |
| 7020 Bare | Gt 0 | Gt 0 | Gt 0 | Gt 0 | Gt 0 | Gt 0 |
| 5083 Bare | Gt 0 | Gt 0 | Gt 0 | Gt 0 | Gt 0 | Gt 0 |
| 6061 Bare | Gt 0 | Gt 0 | Gt 0 | Gt 0 | Gt 0 | Gt 0 |

TABLE 12-2

1000 h Neutral salt spray exposure.
Appearance of scribe in NSS

|  | 10-A Magnesium oxide Scribe appearance | 10-B Magnesium Oxide/ Lithium carbonate Scribe appearance | 10-C Pigmentan ® 465 M/ Lithium carbonate Scribe appearance |
| --- | --- | --- | --- |
| 2024 T3 bare | dark | shiny | shiny |
| 2024 T3 Clad | dark | shiny | shiny |
| 7075 T6 bare | Dark | dull/shiny parts | dull/shiny parts |
| 7075 T6 Clad | Dark | Shiny | shiny |
| 7020 Bare | shiny | Shiny | shiny |
| 5083 Bare | dull | Shiny | shiny |
| 6061 Bare | dull | Shiny | shiny |

All samples showed very good adhesion over the various alloys at initial stage and after 7 days immersion in water. None of the alloys showed sensitivity to the lithium salt-containing formulations. No loss of adhesion or osmotic blistering was observed. After 1,000 hrs of neutral salt spray exposure it was clearly visible that 2024 T3 and 7075 T6 were the substrates most sensitive to corrosion compared to 7020, 5083, and 6061. The lithium carbonate-containing samples clearly stood out in term of scribe appearance. All alloys coated with a sample containing lithium carbonate (10-B and 10-C) showed bright, shiny scribes. Whereas comparative sample 10-A was completely dark and filled with corrosion products. Aluminium alloy 7020 appeared to be the least sensitive to neutral salt spray corrosion. Alloy 7075 T6 Bare showed an improved scribe appearance when coated with lithium-containing samples (10-B-10-C) compared to the sample without lithium carbonate, but not to the same degree as the other alloys. In contrast to this 7075 T6 Clad showed shiny scribes when coated with lithium carbonate-containing paints, whereas the sample without it showed a dark scribe full of corrosion products.

This demonstrates that the addition of lithium salt to a coatings formulation significantly improves the scribe appearance and corrosion protection properties of multiple aluminium alloys.

Example 12

Activity Over Ferrous Substrates

The coating compositions were prepared according to the method described in Example 10.

The substrates were prepared according to the described methods:
Steel 37 (1 mm thick): Pretreatment Method E.
Steel DC 01 Method (1 mm thick): Pretreatment Method E.
Phosphated steel (1 mm thick): only solvent wipe using typical cleaning solvent.

All paints were applied within 1 hour after pretreatment.

For all samples Component B was added to component A and the mixture was stirred to a homogeneous mixture. 30 minutes after mixing the paints were applied in one wet coat to a dry film thickness of 20-30 μm on the various ferrous substrates. After overnight cure a polyurethane-based topcoat Eclipse (ECL-G-101) was applied in 2 coats with 30 minutes flash-off between coats, achieving a dry film thickness of 60-70 μm. All samples were cured at 23±2° C./50±5% RH for 7 days before testing.

The samples containing lithium carbonate showed a very good resistance to creep from the scribe after 1,000 hrs of neutral salt spray (ASTM 117). This performance was equal to or better than the current state of the art chromate-containing technology. The example showed that lithium salts like lithium carbonate can also be used to protect ferrous substrates in addition to their performance in non-ferrous substrates.

Example 13

Sample 13 A: Comparative Mg Rich Primer

| Component | Wt % | Vol % |
|---|---|---|
| Epoxy resin | 19.7 | 20.8 |
| Mg flakes | 34.9 | 26.0 |
| Lithium carbonate | 0 | 0 |
| Additives | 3.1 | 3.1 |
| Solvent blend | 42.3 | 50.0 |

Sample 13 B: Mg Rich Primer with Lithium Carbonate

| Component | Wt % | Vol % |
|---|---|---|
| Epoxy resin | 18.4 | 20.0 |
| Mg flakes | 32.6 | 24.9 |
| Lithium carbonate | 6.5 | 4.1 |
| Additives | 2.8 | 3.0 |
| Solvent blend | 39.6 | 48.0 |

An example of a suitable epoxy resin is the Bisphenol A/epichlorohydrin-based Epon 1001F available from Hexion Specialty Chemicals of Houston, Tex., United States. Mixing of components was accomplished by high speed dispersion.

Prior to application, the bases described above were mixed with the manufacturer-recommended amounts of curing

TABLE 12-1

Adhesion and neutral salt spray

| sample | | | initial adhesion (ISO 2409) | 7 day water immersion (ISO 2409) | NSS (ASTM B117) 1000 h creep from scribe (mm) |
|---|---|---|---|---|---|
| 10-A | Magnesium Oxide | | 0 | 0 | 13 |
| 10-B | Magnesium Oxide/Lithium carbonate | Steel 37 | 0 | 0 | 5 |
| 10-C | Pigmentan ® 465 M/Lithium carbonate | | 0 | 0 | 7 |
| 10-A | Magnesium oxide | | 1 | 2 | 38 |
| 10-B | Magnesium Oxide/Lithium carbonate | Steel DC01 | 1 | 1 | 4.5 |
| 10-C | Pigmentan ® 465 M/Lithium carbonate | | 0 | 0 | 7 |
| 10-A | Magnesium oxide | | 0 | 0 | 4 |
| 10-B | Magnesium oxide/Lithium carbonate | Phosphated steel | 0 | 2 | 2 |
| 10-C | Pigmentan ® 465 M/Lithium carbonate | | 0 | 5 | 3 | agent(s) and solvents to achieve proper cure and application viscosity. An example of a suitable curing agent is the polyamide based Ancamide 220 from Air Products of Allentown, Pa., United States.

Sample 13 C: Comparative Chromate-Based Primer

The positive control primer was a commercially available primer qualified to MIL-PRF-23377, Class C2. Class C2 describes the standard strontium chromate-containing formulations.

Testing

Corrosion test panels were 3"×6" pieces of bare 2024-T3 alloy as specified by MIL-PRF-23377 and MIL-PRF-32239. Surface preparation consisted of PreKote application as described above. Following PreKote application, the test panels were coated with the primer formulations 13 A, 13 B, and 13 C described above. After 5 hours, a MIL-PRF-85285 qualified topcoat, Aerodur 5000, was applied. The coating systems were then allowed to cure for one to two weeks prior to scribing and exposure in ASTM B117 salt spray.

For the purposes of this section of results, the following definitions apply with regard to corrosion observations:
Slight scribe corrosion=scribe less than 10% salted
Moderate scribe corrosion=10-50% salting in the scribes
Severe scribe corrosion=more than 50% salting in the scribes.

TABLE 13-1

1,000 hrs Salt spray test results

| Primer | Result |
|---|---|
| 13A | Severe blistering (<1-5 mm), moderate scribe corrosion |
| 13B | No blistering, moderate scribe corrosion |
| 13C | Severe scribe corrosion, 1 small scribe blister (<2 mm) |

It was clear that after 1,000 hrs of salt spray, blistering was eliminated by the addition of lithium carbonate to the formulation. This was a very large improvement, and in fact, the performance of formulation 13B was better than that of the standard strontium chromate primer 13C.

Magnesium metal primers for the corrosion protection of aerospace aluminium alloys are described in US patent applications US 2007/0128351 and US 2009/0155598. It has been found that a drawback of the primers described therein is the blistering along scribes. One particularly surprising result obtained with the combination of lithium carbonate and magnesium corrosion inhibitors has been the remarkable improvement in corrosion protection when lithium carbonate is added to magnesium metal-based primers. The addition of lithium carbonate to the magnesium-rich primer greatly improved results. Addition of lithium carbonate led to less corrosion in the scribe as well as a great reduction in blistering, thus clearing a hurdle to commercialization of this technology.

The invention claimed is:

1. A coating composition curable below 120° C. comprising a film-forming resin selected from the group consisting of epoxy resins, polyesters, polyacrylates, polyurethanes, polyethers, polyaspartic esters, isocyanates, mercapto-functional resins, amine-functional resins, amide-functional resins, imide-functional resin, acetoacetate resins, functional fluorinated resins, alkyd resins, and mixtures thereof; a curing agent for the film-forming resin; and a lithium salt, wherein the lithium salt is selected from inorganic and organic lithium salts that have a solubility constant in water at 25° C. in the range of $1 \times 10^{-11}$ to $5 \times 10^{-2}$.

2. The coating composition according to claim 1 wherein the lithium salt is selected from the group consisting of lithium carbonate, lithium phosphate, and mixtures thereof.

3. The coating composition according to claim 1 wherein the coating composition is solvent-borne.

4. The coating composition according to claim 1 wherein the coating composition is water-borne.

5. The coating composition according to claim 1 further comprising one or more additional corrosion inhibitors.

6. The coating composition according to claim 5 wherein the additional corrosion inhibitor is a magnesium-containing material.

7. The coating composition according to claim 6 wherein the magnesium-containing material is selected from the group consisting of magnesium metal, magnesium alloy, magnesium oxide, oxyaminophosphate salts of magnesium, magnesium carbonate, and magnesium hydroxide.

8. The coating composition according to claim 1, wherein the lithium salt is present in the coating composition in an amount of 1-40 vol %, based on the sum of the volumes of the non-volatile components of the coating composition.

9. A process of improving the corrosion resistance of a metal substrate, the process comprising
a) applying the coating composition according to claim 1 to the metal substrate, and
b) curing the applied coating composition.

10. The process according to claim 9, wherein the metal of the metal substrate is a non-ferrous metal.

11. The process according to claim 10, wherein the non-ferrous metal is aluminum or an aluminum alloy.

12. The process according to claim 10, wherein the substrate is an aircraft or a part thereof.

13. A substrate coated with the coating composition according to claim 1.

14. The coating composition according to claim 2 wherein the coating composition is solvent-borne.

15. The coating composition according to claim 2 wherein the coating composition is water-borne.

16. The coating composition according to claim 2 further comprising one or more additional corrosion inhibitors.

17. The coating composition according to claim 16 wherein the additional corrosion inhibitor is a magnesium-containing material.

18. The coating composition according to claim 17 wherein the magnesium-containing material is selected from the group consisting of magnesium metal, magnesium alloy, magnesium oxide, oxyaminophosphate salts of magnesium, magnesium carbonate, and magnesium hydroxide.

19. The coating composition according to claim 2, wherein the lithium salt is present in the coating composition in an amount of 1-40 vol %, based on the sum of the volumes of the non-volatile components of the coating composition.

* * * * *